(12) United States Patent
Patel et al.

(10) Patent No.: US 9,191,803 B2
(45) Date of Patent: Nov. 17, 2015

(54) CONNECTION STATE-BASED LONG TERM EVOLUTION STEERING OF ROAMING

(71) Applicant: Cellco Partnership, Basking Ridge, NJ (US)

(72) Inventors: Jignesh J. Patel, Haltom City, TX (US); Miguel A. Carames, Martinez, CA (US); Amol Tuli, Dublin, CA (US); Khalil M. Kajani, Carrollton, TX (US)

(73) Assignee: Cellco Partnership, Basking Ridge, NJ (US)

( * ) Notice: Subject to any disclaimer, the term of this patent is extended or adjusted under 35 U.S.C. 154(b) by 190 days.

(21) Appl. No.: 14/017,683

(22) Filed: Sep. 4, 2013

(65) Prior Publication Data

US 2015/0065125 A1 Mar. 5, 2015

(51) Int. Cl.
*H04W 4/00* (2009.01)
*H04W 8/12* (2009.01)
*H04W 12/06* (2009.01)
*H04W 4/02* (2009.01)
*H04W 8/06* (2009.01)

(52) U.S. Cl.
CPC . *H04W 8/12* (2013.01); *H04W 4/02* (2013.01); *H04W 8/06* (2013.01); *H04W 12/06* (2013.01)

(58) Field of Classification Search
CPC .......... H04W 8/06; H04W 4/02; H04W 12/06
See application file for complete search history.

(56) References Cited

U.S. PATENT DOCUMENTS

2012/0236824 A1* 9/2012 McCann et al. ............. 370/331

* cited by examiner

*Primary Examiner* — Khalid Shaheed

(57) ABSTRACT

A method, a device, and a non-transitory storage medium comprising instructions that provide steering of roaming services based on connection state data pertaining to Diameter connections between visited networks and an internetwork. The steering of roaming services include accepting or denying a request of a roaming user seeking to attach to a visited network and managing and deploying preferred visited network lists to user devices.

25 Claims, 20 Drawing Sheets

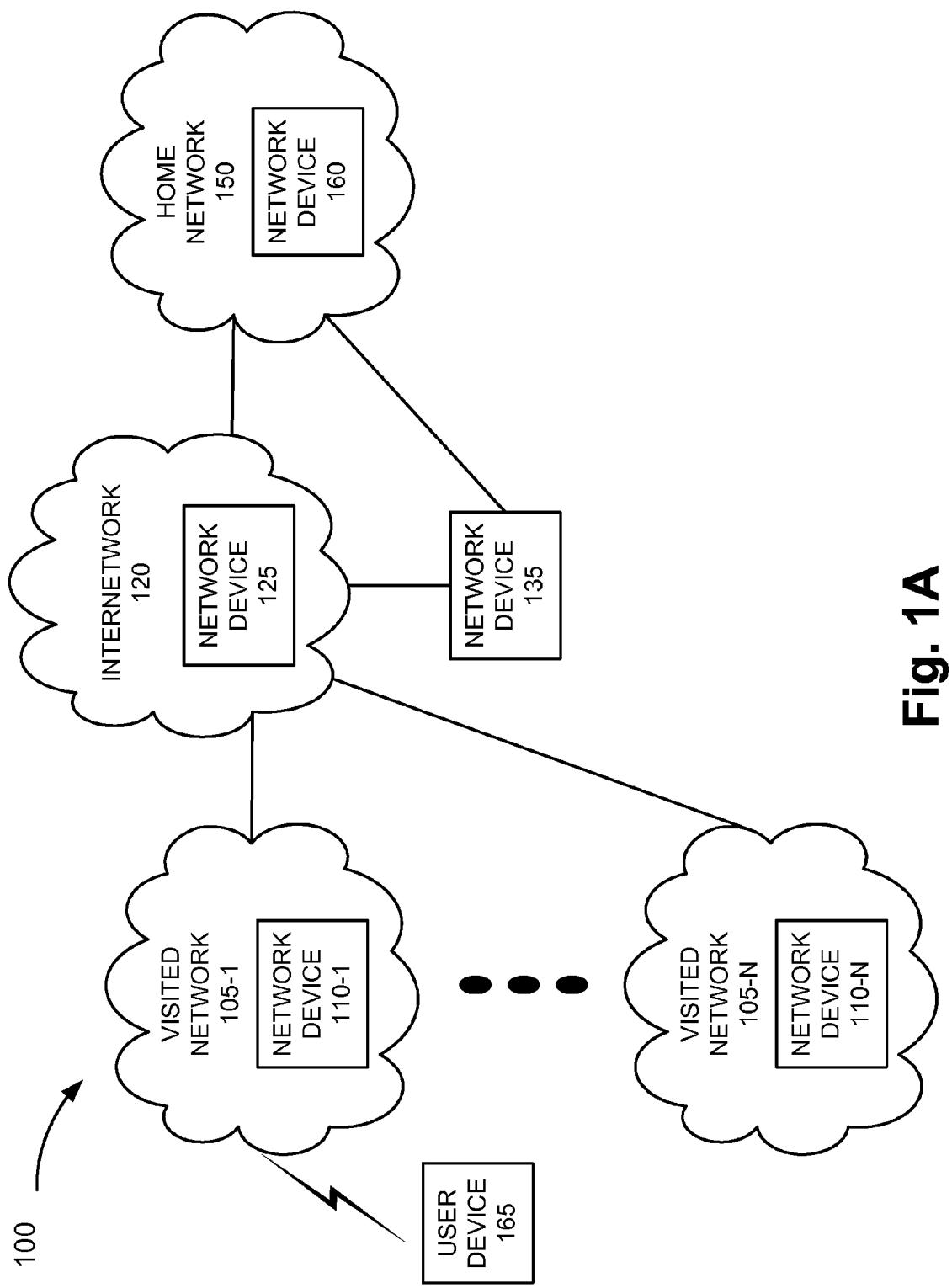

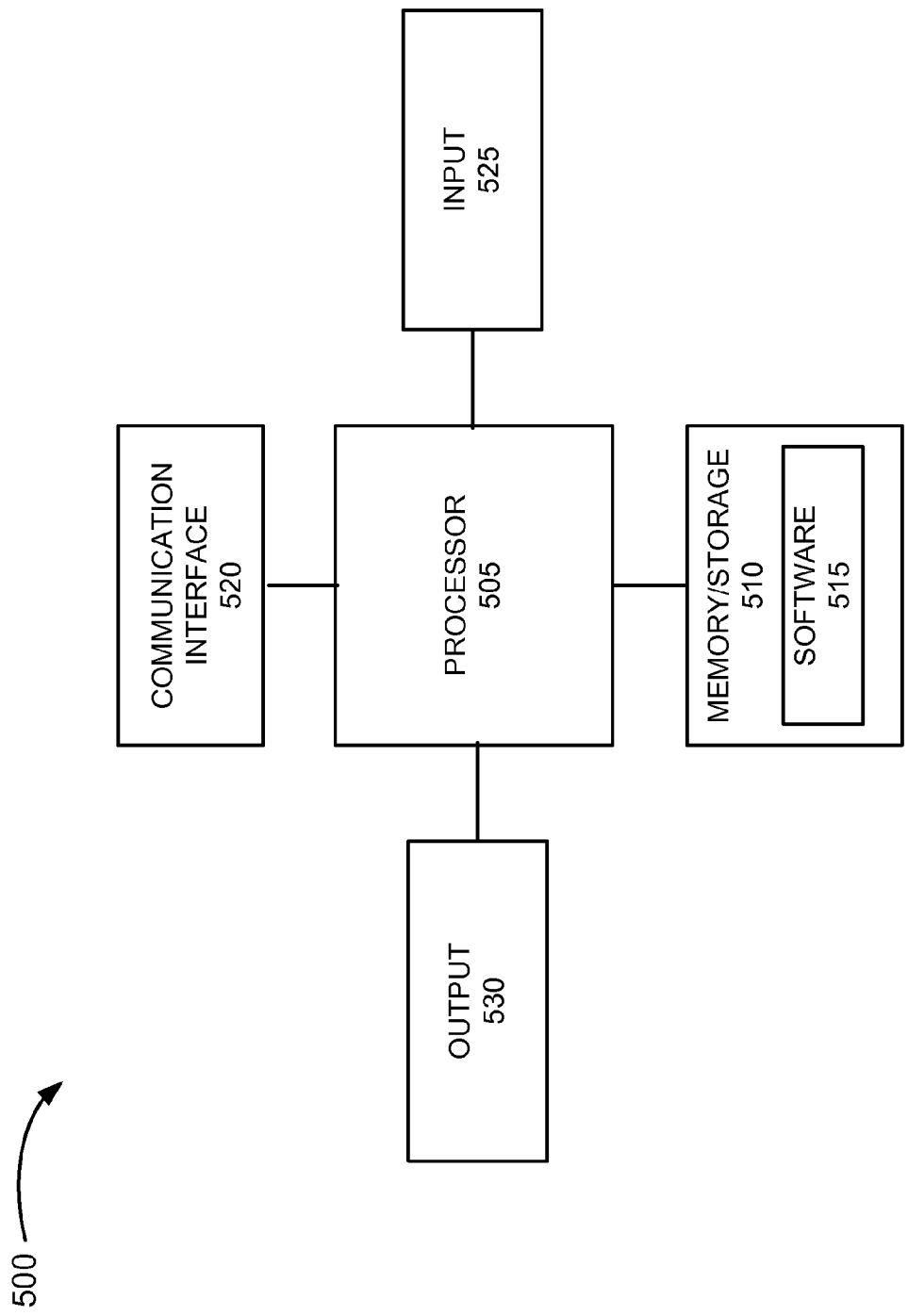

CONNECTION STATE-BASED LONG TERM EVOLUTION STEERING OF ROAMING

BACKGROUND

Roaming allows mobile wireless users to receive services when users are outside of a service area covered by the users' home network provider. Mobile wireless service providers enter into roaming agreements with each other so that their users are able to roam and receive seamless service regardless of their users' location.

BRIEF DESCRIPTION OF THE DRAWINGS

FIG. 1A is a diagram illustrating an exemplary environment in which an exemplary embodiment of steering of roaming may be implemented;

FIG. 5 is a diagram illustrating exemplary components of a device that may correspond to one or more devices in the environments described herein;

DETAILED DESCRIPTION

Figure 1B:
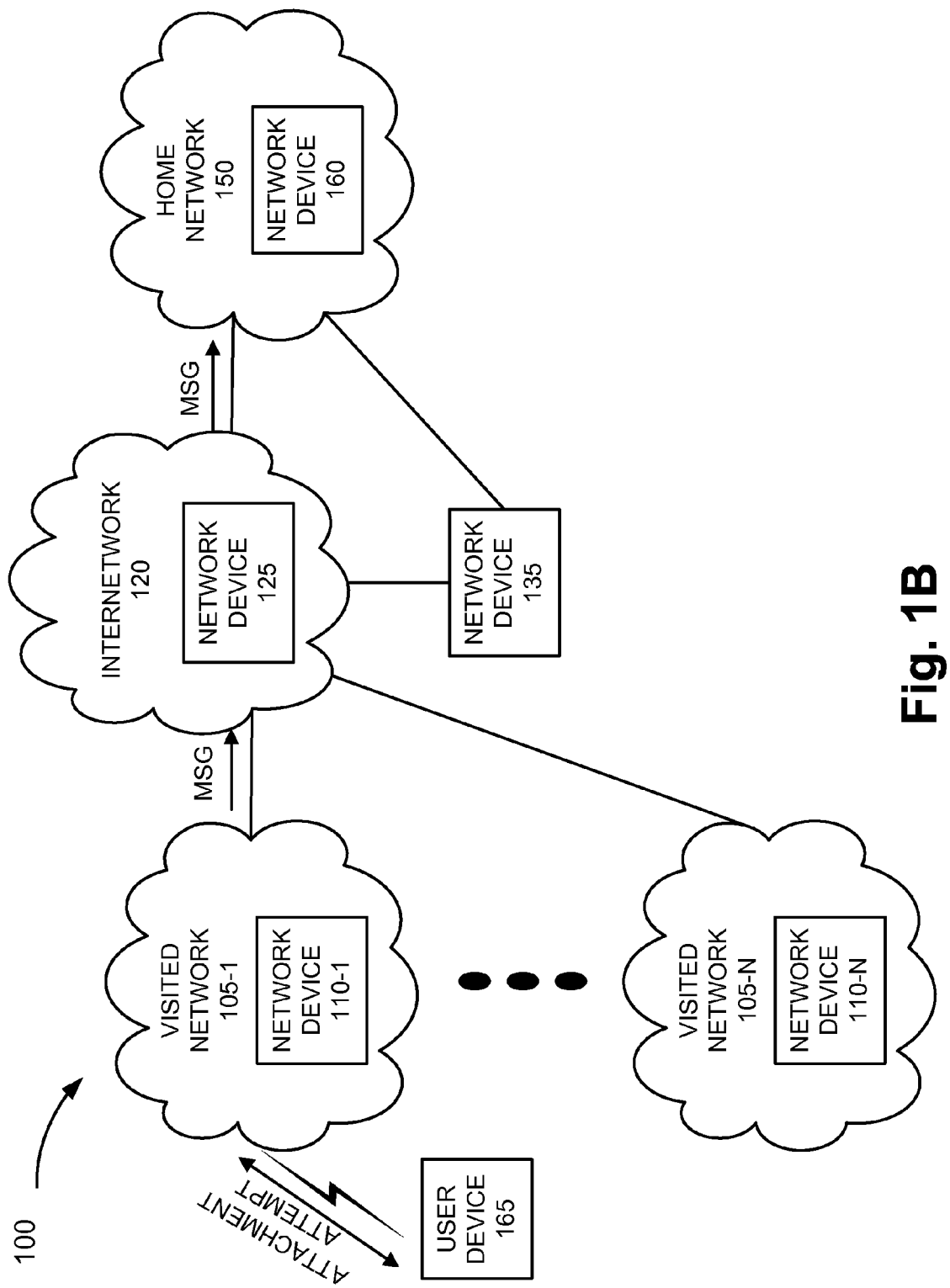
FIG. 1B and FIG. 1C are diagrams illustrating an exemplary process pertaining to steering of roaming according to an exemplary embodiment.

The following detailed description refers to the accompanying drawings. The same reference numbers in different drawings may identify the same or similar elements. Also, the following detailed description does not limit the invention.

Steering of roaming refers to a process by which a roaming user of a home network is steered to a visited network to provide service for the roaming user. Long Term Evolution (LTE) roaming is at a very early stage in the wireless industry.

As described herein, reference is made to "an exemplary embodiment," "embodiments," etc., which may include a particular feature, structure or characteristic in connection with an embodiment(s). However, the use of the phrase or the term "an embodiment," "embodiments," etc., in various places herein does not necessarily refer to all embodiments described, nor does it necessarily refer to the same embodiment, nor are separate or alternative embodiments necessarily mutually exclusive of other embodiment(s). The same applies to the term "implementation," "implementations," etc.

According to an exemplary embodiment, a device, a method, and a non-transitory storage medium storing instruction thereon, determines to which visited network a roaming user attaches based on connection state data. According to an exemplary embodiment, the connection state data pertains to Diameter connections between an Internetwork and visited networks. According to an exemplary embodiment, a steering of roaming decision is based on business rules and steering data, which includes the connection state data. According to an exemplary embodiment, the steering of roaming decision includes determining whether to update a preferred visited network list. According to an exemplary embodiment, a preferred visited network list is transmitted to a user device in response to various events, as described herein. User devices store and use preferred visited network lists when selecting a visited network to which to attach.

FIG. 1A is a diagram illustrating an exemplary environment 100 in which an exemplary embodiment of steering of roaming may be implemented. As illustrated in FIG. 1A, exemplary environment 100 includes visited networks 105-1 through 105-N, in which N>1 (referred to collectively as visited networks 105 and individually as visited network 105) that include network devices 110-1 through 110-N (referred to collectively as network devices 110 and individually as network device 110). As further illustrated, environment 100 includes an internetwork 120. Internetwork 120 includes a network device 125. Environment 100 also includes a network device 135, a home network 150 that includes a network device 160, and a user device 165.

Environment 100 may include wireless links or wireless and wired links among the devices and networks illustrated. A link may be direct or indirect and may involve intermediary device(s) and/or intermediary network(s) not illustrated in FIG. 1A. The links illustrated in environment 100 are exemplary.

Each of visited networks 105 includes a wireless network. For example, visited network 105 may be implemented to include a Long Term Evolution (LTE) network (i.e., a 4G wireless infrastructure), an LTE Advanced network, or future generation wireless network architecture. Each of network devices 110 provides signaling to support the establishment and maintenance of connections with roaming users. For example, each of network devices 110 may be implemented to include a Diameter Edge Agent (DEA) or similarly functioning network element (e.g., a proprietary network element, etc.). Although not illustrated in FIG. 1A, each of visited networks 105 includes other network elements (e.g., logic) to provide, among other services, a wireless connection service, such as a base station (e.g., an evolved Node B (eNB), etc.), a serving gateway (SGW), etc., a billing service, such as a Policy Charging and Rules Function (PCRF), etc.

Internetwork 120 includes a network that provides an interconnection service between visited networks 105 and home network 150. For example, internetwork 120 may be implemented as an Internetwork Packet Exchange (IPX)/Sequenced Packet Exchange (SPX) network, an Internet Protocol (IP) exchange (IPX) network, or other suitable network that may provide an interconnection service. Network device 125 provides a signaling service. For example, network device 125 may be implemented to include a Diameter Agent (e.g., a Diameter Relay Agent (DRA), a Diameter Proxy Agent (DPA), etc.). The Diameter Agent includes a stateful agent. For example, the Diameter Agent may maintain session state data pertaining to active sessions. Additionally, for example, the Diameter Agent monitors a connection state pertaining to links between visited networks 105 and internetwork 120. For example, the Diameter Agent may use keep-alive messages and time-out mechanisms to identify when a connection is up or down. The connections via the links between visited networks 105 and internetwork 120 may be persistent connections.

According to an exemplary embodiment, the Diameter Agent includes a notification service pertaining to the connection state of links between visited networks 105 and internetwork 120. The notification service may be an add-on application to the specifications of the Diameter protocol. The notification service may be configured with a dictionary interface or module (e.g., generated based on a dictionary file using a diametric utility) that allows Diameter messages and attribute value pairs (AVPs) to be defined and input into a Diameter message. The service configuration of the notification service is also supported by a transport interface that provides for the transport (e.g., over TCP, etc.) of the Diameter messaging.

According to an exemplary embodiment, the Diameter Agent generates and transmits a Capabilities-Exchange-Request (CER) message to network device 135 in response to detecting a change in connection state of a link (e.g., link up to link down or link down to link up) between visited network 105 and internetwork 120. According to an exemplary embodiment, the CER is generated when a failover procedure (e.g., to route messages to an alternate Diameter agent) has been unsuccessful. The CER message may include an AVP to identify the visited network 105 whose link state has changed (e.g., a mobile network code (MNC), a mobile country code (MCC)) and an AVP (e.g., a vendor specific AVP) to indicate the state of the link (e.g., up, down). The CER message may also include other data pertaining to the connection failure/state, as described herein, using appropriate AVPs, etc. According to other embodiments, the Diameter Agent may generate and transmit a different type of Diameter message. For example, the Diameter Agent may generate and transmit an error message to network device 135 having a result code AVP, which indicates that Diameter is unable to deliver (i.e., to visited network 105).

Although not illustrated in FIG. 1A, internetwork 120 may include other network elements (e.g., logic) to provide, among other services, interconnection services, such as border controllers, media gateways, session accounting services, security services, Internet Protocol (IPv4)/IPv6 interworking, transcoding, etc. According to an exemplary embodiment, network device 125 also includes a network element (e.g., a connection manager) that provides a communicative interface to network device 135, as described further below. Alternatively, according to an embodiment, network device 135 includes the connection manager.

Network device 135 provides steering of roaming services. For example, network device 135 makes steering decision based on connection states between internetwork 120 and visited networks 105. Network device 135 uses other steering data, such as business rules, to make steering decisions pertaining to roaming users. Network device 135 manages preferred visited network lists. Network device 135 provides preferred visited network lists to roaming users via user devices 165. Network device 135 includes a Diameter Agent. The Diameter Agent may generate and transmit a Capability-Exchange-Answer (CEA) to network device 125 in response to receiving the CER from the Diameter Agent of network device 125.

Home network 150 includes a wireless network. For example, home network 150 may be implemented to include an LTE network, an LTE Advanced network, or future generation wireless network architecture. Network device 160 provides a signaling service. For example, network device 160 may be implemented to include a Diameter Agent (e.g., a DRA, a DPA, etc.). Although not illustrated in FIG. 1A, home network 150 may include other network elements to provide, among other services, a wireless connection service, such as a base station, a Packet Data Network gateway (PGW), etc., authentication, authorization, and accounting (AAA) services, such as a home subscriber server (HSS), etc.

User device 165 includes a mobile communication device. For example, user device 165 may be implemented as a wireless phone (e.g., a radio phone, a smartphone, etc.), a computer (e.g., a tablet, a netbook, a laptop computer, etc.), a vehicular communication system, etc. According to an exemplary embodiment, user device 165 stores a preferred visited network list. As described further below, user device 165 uses the preferred visited network list to select a visited network 105 when roaming.

The number of devices and configuration in environment 100 is exemplary and provided for simplicity. According to other embodiments, environment 100 may include additional devices, fewer devices, different devices, and/or differently arranged devices than those illustrated in FIG. 1A. Additionally, according to other embodiments, environment 100 may include additional networks, fewer networks, different networks, and/or differently arranged networks than those illustrated in FIG. 1A. For example, according to an embodiment, environment 100 includes multiple internetworks 120.

A device, as described herein, may be implemented according to a centralized computing architecture, a distributed computing architecture, or a cloud computing architecture. A device may be implemented according to one or multiple network architectures (e.g., a client device, a server device, a peer device, a proxy device, or some combination thereof). According to other embodiments, a single device may be implemented as multiple devices and/or multiple devices may be implemented as a single device.

Also, according to other embodiments, one or more functions and/or processes described as being performed by a particular device or a particular network element may be performed by a different device, or some combination of devices, which may or may not include the particular device.

While exemplary embodiments described may be implemented based on the use of a particular network architecture, platform, protocol, etc., such implementations are not intended to be restrictive or provide an exhaustive treatment, as such. In other words, the embodiments described herein may be implemented using other suitable network architectures, platforms, protocol, etc., which may not be specifically described.

Figure 1C:
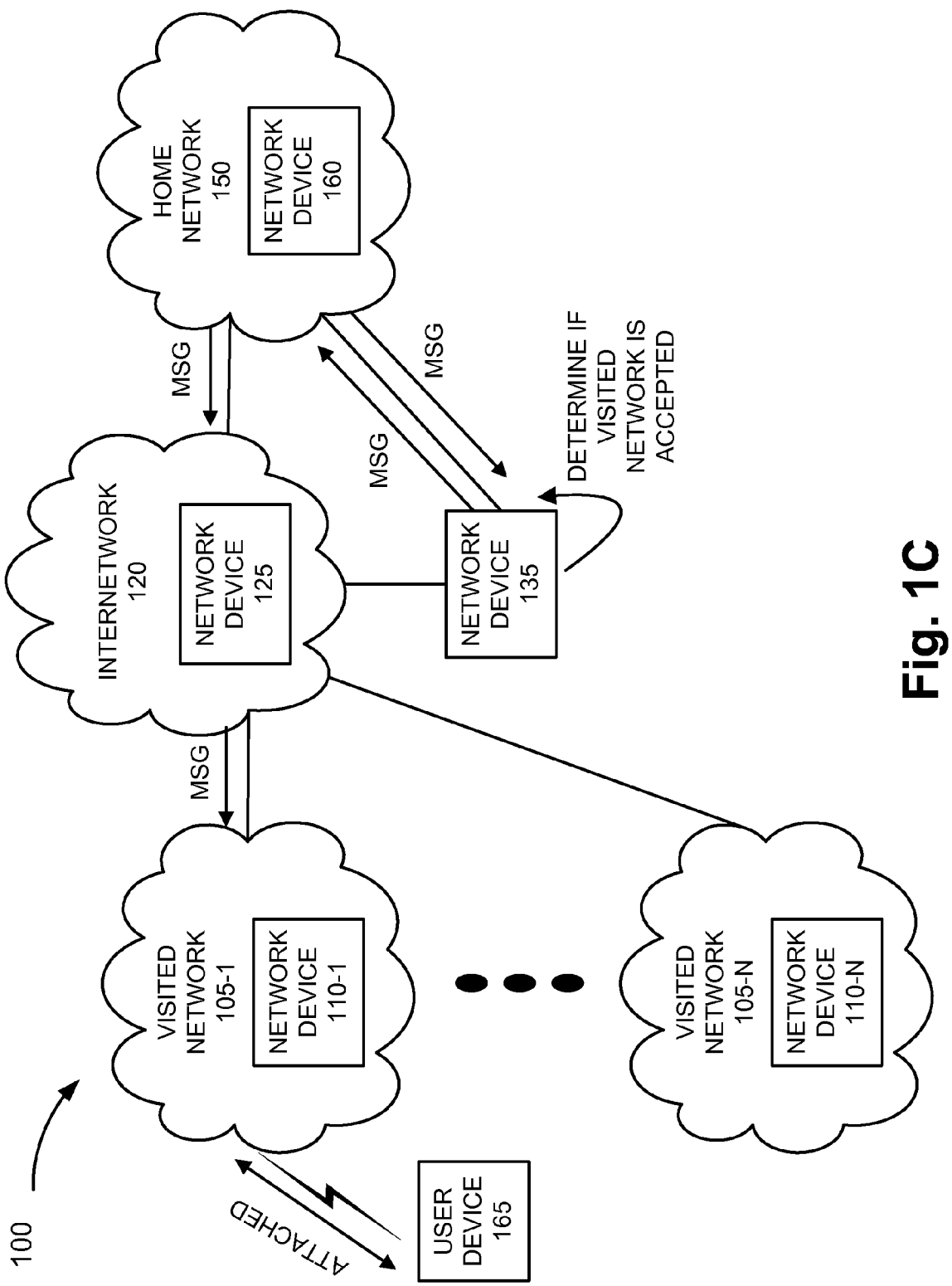

FIG. 1B and FIG. 1C are diagrams illustrating an exemplary process pertaining to steering of roaming according to an exemplary embodiment. Referring to FIG. 1B, assume that user device 165, which is associated with a roaming user (not illustrated), attempts to attach to visited network 105-1. According to this exemplary scenario, assume that a Diameter connection between visited network 105-1 and internetwork 120 is active (i.e., up). During the attachment process, an authentication procedure is invoked in which network device 110-1 transmits a message (illustrated as MSG) to network device 125. The message includes, among other data, a user name attribute-value pair (AVP), which includes a user identifier (e.g., an International Mobile Subscriber Identity (IMSI) of the roaming user), a command (e.g., an update-location-request (ULR)), a destination-realm AVP, etc. Network device 125 receives the message. In response thereto, network device 125 may identify home network 150 as the home network of the roaming user (e.g., based on the destination-realm AVP). Network device 125 may also modify the message (e.g., transcoding, etc.) before transmitting a message to network device 160 of home network 150.

Referring to FIG. 1C, network device 160 receives the message and transmits the message to network device 135. As illustrated, network device 135 determines whether visited network 105-1 is an acceptable network to which the roaming user can attach. For example, network device 135 applies business rules pertaining to steering of roaming to determine whether visited network 105-1 is an acceptable network. Network device 135 may use other steering data (e.g., connection state data between internetwork 120 and visited network 105-1) to determine whether visited network 105-1 is an acceptable network.

According to this scenario, network device 135 determines that visited network 105-1 is acceptable and transmits a message to an authentication device (e.g., a Home Subscriber Server (HSS)) (not illustrated) of home network 150. The message indicates to the authentication device that visited network 105-1 is an acceptable network to which the roaming user can attach. The authentication device receives and interprets the message. In response, the authentication device performs authentication, authorization, etc. The authentication device transmits a message (not illustrated) to network device 160. For example, the message may include subscription data pertaining to the roaming user. Network device 160 generates and transmits a message to network device 125. For example, the message includes, among other data, a command (e.g., an update-location answer (ULA)). Network device 125 receives the message and transmits the message to network device 110-1. Network device 110-1 receives the message and visited network 105-1 completes the authentication procedure. As illustrated, user device 165 attaches to visited network 105-1.

Figure 1D:
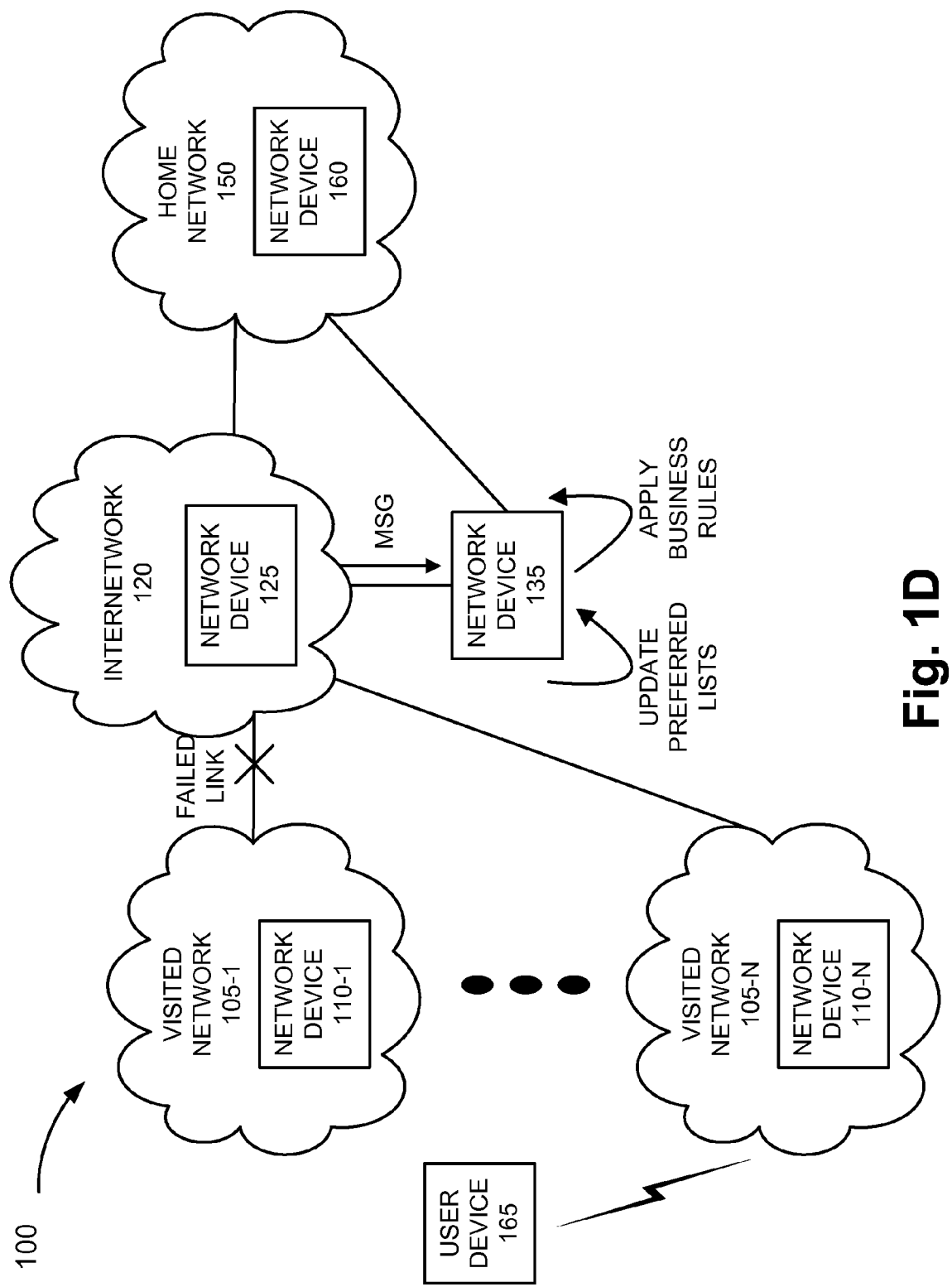
FIGS. 1D and 1E are diagrams illustrating another exemplary process pertaining to steering of roaming according to an exemplary embodiment.
Figure 1E:
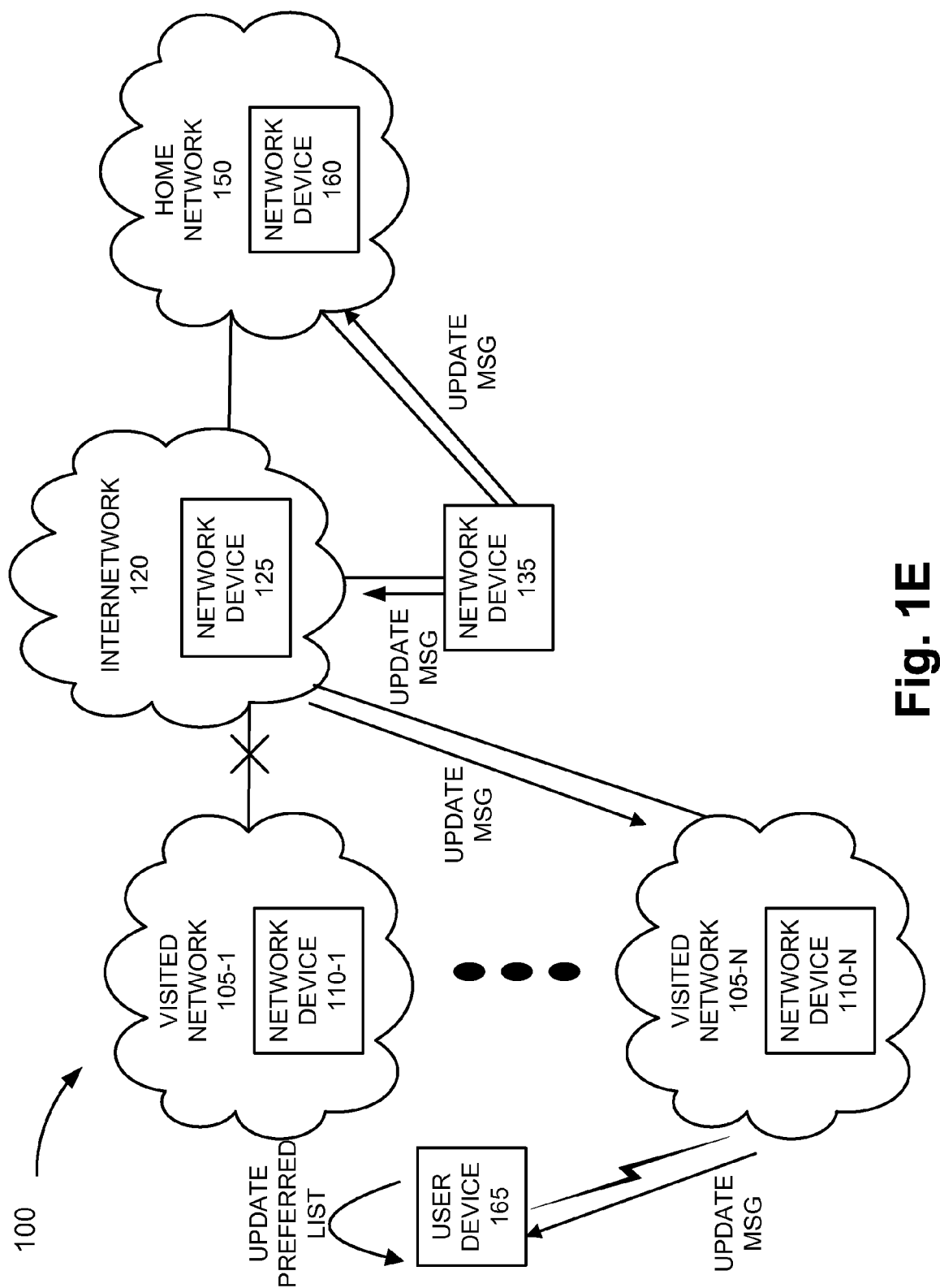

FIGS. 1D and 1E are diagrams illustrating another exemplary process pertaining to steering of roaming according to an exemplary embodiment. Referring to FIG. 1D, assume that a connection between visited network 105-1 and internetwork 120 fails (i.e., is down). Network device 125 (e.g., the Diameter Agent) monitors the connection state between internetwork 120 and visited network 105-1. In response to the connection failure, network device 125 identifies that the connection is down and generates connection state data. The connection state data indicates that the connection is down. The connection state data is stored by network device 125.

According to an exemplary embodiment, the connection manager of network device 125 or network 135 monitors the Diameter Agent. In response to identifying the presence of the connection state data, the connection manager obtains the connection state data. The connection manager may also obtain other data from other network devices regarding the connection state failure. For example, connection manager may obtain other data, such as data indicating the reason for the connection failure, etc. By way of example, the connection failure may stem from a device failure in visited network 105-1, a device failure in internetwork 120, an intermediary node, an intermediary link, an upgrade, maintenance, etc. The connection manager generates a message that indicates that the connection has failed, a date and time, etc. The connection manager transmits the message to network device 135.

According to another exemplary embodiment, in response to the connection failure, the Diameter Agent of network device 125 generates and transmits a CER message to network 135. For example, the CER message includes an AVP that identifies visited network 105-1 and an AVP that indicates that the link is in a down state.

Network device 135 receives the message (e.g., the CER message or the message from the connection manager). In response to receiving the message, network device 135 stores the connection state data. Additionally, network device 135 makes a steering decision in response to receiving the message. For example, the steering decision may include whether to update a preferred visited network list, which may be used by roaming users. Network device 135 may make the steering decision based on a set of business rules pertaining to the management of preferred visited network lists. Additionally, network device 135 may make the steering decision based on other steering data. For example, the steering data includes the connection state data and other types of data (e.g., historical state data, etc.), as described further below.

Referring to FIG. 1D, according to this example, based on the application of the business rules and the connection state data, network device 135 determines to update a preferred visited network list. For example, assume that visited network 105-1 is listed first (i.e., the most preferred) in a current preferred visited network list. In view of the failed connection, network device 135 may, for example, remove visited network 105-1 from the preferred visited network list or change the order in which visited network 105-1 appears in the preferred visited network list (e.g., place visited network 105-1 at the bottom of the preferred visited network list). Network device 135 may store the updated preferred visited network list. Additionally, for this example, assume that a business rule indicates that a preferred visited network list for users roaming in a particular country or other geographic region will receive an over-the-air update of the preferred visited network list. In this way, the steering of roaming service proactively enhances the experience of roaming users by providing roaming users with an update to avoid visited network 105-1 since it is in a down state. By way of example, user device 165 may include a smart card (e.g., a Subscriber Identity Module (SIM) card, an integrated circuit card (ICC), a universal integrated circuit card (UICC), or a removable user identity module (RUIM) card) or other storage medium that stores preferred visited network lists. User device 165 may include a device management client or other suitable logic to manage and configure user device 165 based on the preferred visited network lists.

Referring to FIG. 1E, based on this business rule, network device 135 transmits the updated preferred visited network list (illustrated as UPDATE MSG) to internetwork 120. The update message may also designate a geographic region in which the update message is to be distributed. According to this example, internetwork 120 transmits the update message to visited network 105-N, which in turn, transmits the update message to user device 165. User device 165 updates a stored preferred visited network list with the received preferred visited network list. Additionally, or alternatively, network device 135 transmits the update message to appropriate users via home network 150. For example, home network 150 may include a server device (not illustrated) that manages over-the-air (OTA) updates. In response to receiving the update message, the server device of home network 150 would provide the updated preferred visited network list to appropriate users. In this way, user devices 165 may avoid unnecessary network scans (e.g., with regard to visited network 105-1) based on the updated preferred visited network list. As an example, assume that user device 165 attempted to attach to visited network 105-1 during the connection failure. In response to an unsuccessful attachment, user device 165 eventually attaches to visited network 105-N. User device 165 receives the updated preferred visited network list and is informed not seek attachment to visited network 105-1 until the connection is restored and user device 165 is updated again to add back visited network 105-1 to the preferred visited network list.

Figure 2A:
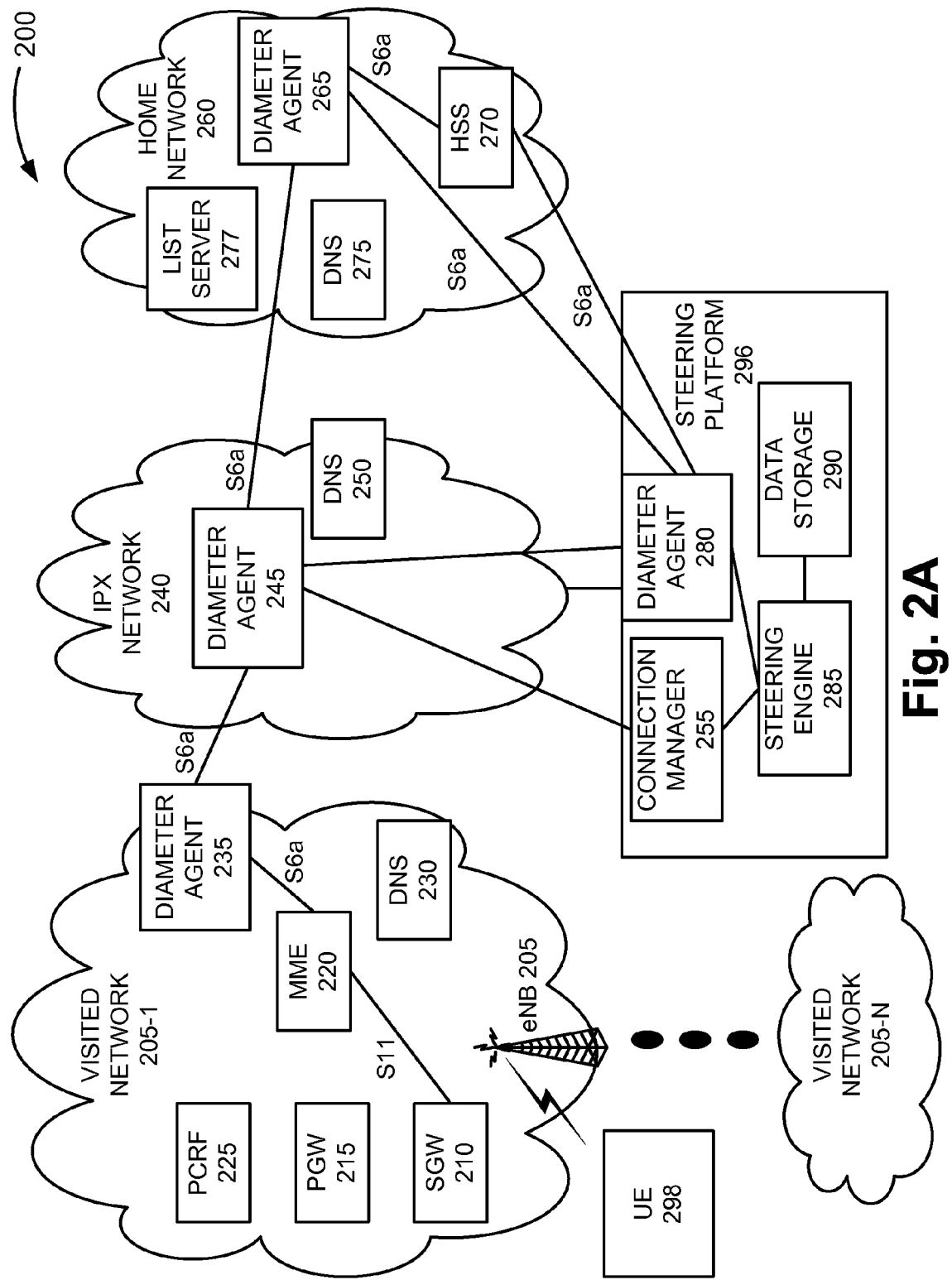
FIG. 2A is a diagram illustrating another exemplary environment in which steering of roaming may be implemented.

FIG. 2A is a diagram illustrating an exemplary environment 200 in which steering of roaming may be implemented. As illustrated, environment 200 includes visited networks 205-1 through 205-N, in which N>1 (referred to collectively as visited networks 205 and individually as visited network 205), an IP Exchange (IPX) network 240, a home network 260, and a steering platform 296. Environment 200 also includes user equipment (UE) 298.

Environment 200 may include wireless links or wireless and wired links among the devices and networks illustrated. A link may be direct or indirect and may involve intermediary device(s) and/or intermediary network(s) not illustrated in FIG. 2A. The links illustrated in environment 200 are exemplary. Additionally, as illustrated in FIG. 2A, devices/network elements may include a particular interface (e.g., S6a, S11) to communicate with other devices/network elements. For example, the S6a interface enables the transfer of subscriber related data between MME 220 and Diameter Agent 235, etc.

Each of visited networks 205 include LTE-based network elements, such as an enhanced Node B (eNB) 205, a serving gateway (SGW) 210, a packet data network (PDN) gateway (PGW) 215, and a mobility management entity (MME) 220. Additionally, each of visited networks 205 may include a policy and charging rules function (PCRF) 225 and a domain name system (DNS) 230. Also, each of visited networks 205 includes a Diameter Agent 235. Diameter Agent 235 may be implemented as a Diameter Edge Agent (DEA).

IPX network 240 includes a Diameter Agent 245 and a domain name system (DNS) 250. Diameter Agent 245 may be implemented as a Diameter Relay Agent (DRA), a Diameter Proxy Agent (DPA), etc. Diameter Agent 245 includes a stateful agent. For example, Diameter Agent 245 may maintain session state data pertaining to active sessions. Additionally, Diameter Agent 245 monitors a connection state pertaining to links between visited networks 205 and IPX 240. For example, Diameter Agent 245 may use keep-alive messages and time-out mechanisms to identify when a connection is up or down. The connections via the links between visited networks 205 and IPX network 240 may be persistent connections. In this way, as described herein, a steering engine 285 of steering platform 296 may steer roaming users to a particular visited network 205 based on the connection state(s) of links between IPX network 240 and visited networks 205. According to an exemplary embodiment, Diameter Agent 245 includes the notification service, as described herein.

Home network 260 includes a Diameter Agent 265, an HSS 270, a DNS 275, and a list server 277. Diameter Agent 265 may be implemented as a DRA, a DPA, etc. HSS 270 may be implemented as a home subscriber server. For example, HSS 270 may store user subscription data, perform authentication and authorization, etc. List server 277 may manage updates of preferred visited network lists. For example, a preferred visited network list may be updated on UE 298 via a Short Messaging Service (SMS), via an over-the-air (OTA) update, and/or via other well-known techniques.

Steering platform 296 includes a Diameter Agent 280, a steering engine 285, a connection manager 255, and a data storage 290. Connection manager 255 includes an interface (e.g., an application programming interface (API), etc.) to Diameter Agent 245 that allows connection manager 255 to obtain connection state data and session state data. According to an exemplary implementation, connection manager 255 acts as a proxy between Diameter Agent 245 and steering engine 285. Connection manager 255 notifies steering engine 285 of the state of the connections between IPX network 240 and visited networks 205. For example, a connection state change (e.g., from up to down or from down to up) causes connection manager 255 to notify steering engine 285. According to other embodiments, connection manager 255 may reside in IPX network 240. Diameter Agent 280 may be implemented as a Diameter Relay Agent (DRA), a Diameter Proxy Agent (DPA), etc.

Steering engine 285 provides steering of roaming pertaining to roaming users. Steering engine 285 makes steering decisions based on business rules and other steering data stored in data storage 290. Steering engine 285 manages preferred network lists and updates preferred visited network lists. Steering engine 285 is described further below.

Data storage 290 stores various types of data that is used by steering engine 285. For example, data storage 290 may store business rules that pertain to the management of preferred visited network lists. Data storage 290 may store historical state data pertaining to the connection state of links between IPX 240 and visited networks 205. Data storage 290 may also store network data. For example, network data may indicate attributes of visited networks 205. Data storage 290 may also store preferred visited network lists. Data storage 290 is described further below. UE 298 is a mobile device. For example, UE 298 may be implemented as user device 165.

The number of devices and configuration in environment 200 is exemplary and provided for simplicity. According to other embodiments, environment 200 may include additional devices, fewer devices, different devices, and/or differently arranged devices than those illustrated in FIG. 2A. For example, environment 200 may not include connection manager 255, but use the notification service of Diameter Agent 245 to communicate with steering platform 296. Additionally, according to other embodiments, environment 200 may include additional networks, fewer networks, different networks, and/or differently arranged networks than those illustrated in FIG. 2A. For example, according to an embodiment, environment 200 includes multiple IPX networks 240. Additionally, as previously described, a device may be implemented according to various computing architectures and network architectures. Also, a single device may be implemented as multiple devices and/or multiple devices may be implemented as a single device. For example, steering platform 296 may be implemented as a single device or multiple devices.

Figure 2B:
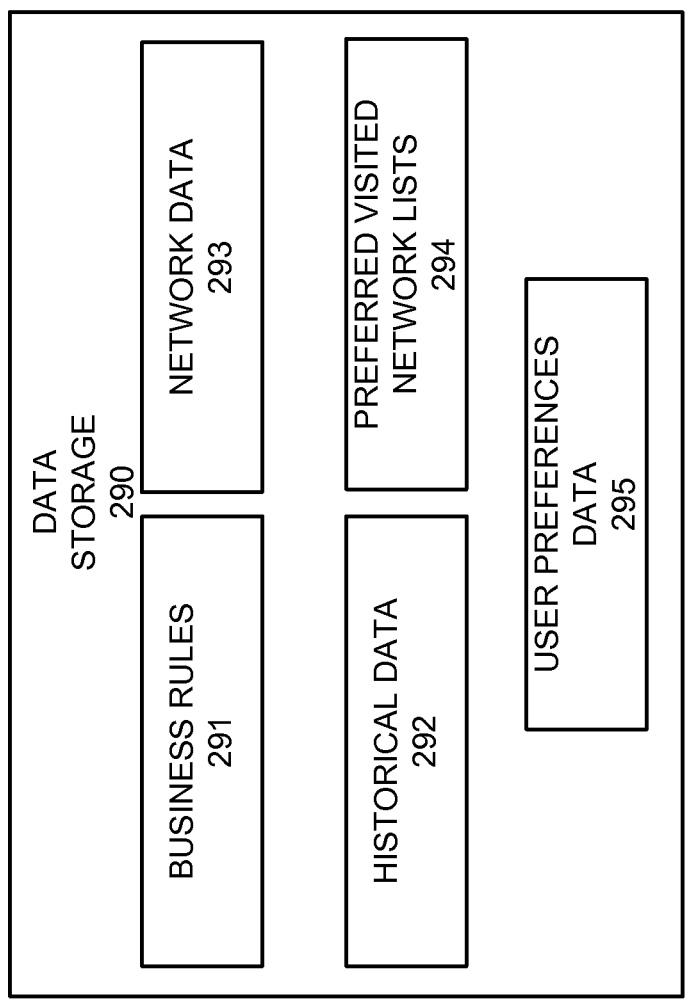
FIG. 2B is a diagram illustrating exemplary data stored in a data storage of an exemplary embodiment of a steering system.

FIG. 2B is a diagram illustrating exemplary steering data stored by data storage 290. As illustrated, data storage 290 includes business rules 291, historical data 292, network data 293, preferred visited network lists 294, and user preferences data 295.

Business rules 291 include business policies or procedures pertaining to the steering of roaming users. For example, business rules 291 may include policies pertaining to steering when a connection between IPX 240 and visited network 205 is "flapping" (e.g., going down, coming up, etc.), policies pertaining to determining when a flapping condition has stopped; policies pertaining to steering depending on the type of roaming user (e.g., pre-paid, post-paid, customer, employee, etc.), policies pertaining to when to update a preferred visited network list, policies pertaining to which roaming users to provide an updated preferred visited network list, policies pertaining to the generation of an updated preferred visited network list, etc.

Historical data 292 indicates the historical connection states between IPX 240 and each of visited networks 205. For example, historical data 292 may indicate time periods (e.g., date and time) when a connection was up and time periods when a connection was down. Additionally, historical data 292 may indicate the number of times the connection went up and down. Historical data 292 may indicate the reason for a failure (e.g., maintenance, link failure, device failure, software failure, power outage, upgrade, etc.).

Historical data 292 may also include a reliability parameter. For example, the reliability parameter may have a value (e.g., from one to ten or some other numerical range) that indicates a degree of reliability of a connection based on the historical data for that connection. By way of further example, a reliability parameter having a value of one indicates the lowest degree of reliability and a value of ten indicates the highest degree of reliability. Historical data 292 includes data indicating the current state of a connection (e.g., up or down).

Steering engine 285 may store data as historical data 292 that indicates that a connection is in a flapping state (e.g., fluctuating between an up and a down state) based on the duration of each up and down state, as well as the number of times (e.g., a counter) this occurs within a particular period of time. For example, steering engine 285 may apply thresholds pertaining to time periods and frequency. Historical data 292 may also include a stable state parameter that steering engine 285 may use before steering roaming users to a previously identified flapping of a connection. For example, the previously identified flapping state of a connection should remain in a stable state (i.e., an up state) for a certain time period before steering engine 285 steers roaming users to that connection.

Network data 293 indicates characteristics of a visited network 205. For example, network data 293 may indicate the type of network, the size of the network (e.g., geographic reach), the services provided, performance metrics, etc. Network data 293 may also indicate other types of data, such as maintenance schedules, upgrade schedules, average response time to correct failures, etc.

Preferred visited network lists 294 include lists that indicate a preferred order of visited networks 205 from which UEs 298 of roaming users can select. According to an exemplary implementation, preferred visited network lists 294 may include different versions of a preferred visited network list that are correlated. For example, there may be an original version of a preferred visited network list and a modified version of a preferred visited network list. The steering data of preferred visited network lists 294 is described further below in relation to FIG. 2D and FIG. 3.

User preferences data 295 indicate preferences of users when roaming. For example, users may indicate that steering be based on monetary cost, performance metrics (e.g., data speeds for upload, download, etc.), network services/applications (e.g., security, location service, application servers, etc.), type of coverage, and/or other types of criteria.

Although FIG. 2B illustrates particular types of steering data stored by data storage 290, according to other embodiments, data storage 290 may include additional types of data, fewer types of data, and/or different types of data than the types of data illustrated and described. For example, data storage 290 may store data pertaining to roaming agreements between a home network service provider and a visited network service provider. For example, a roaming agreement may specify that an operator commit to steer an agreed volume of roaming traffic to a preferred partner and the preferred partner may give a discount on roaming prices. Data storage 290 may store near real-time roaming data that indicates usage data of a preferred visited network. For example, IPX 240 may include a roaming intelligence service that generates roaming reports. Steering engine 285 may use this additional data to manage steering and preferred visited network lists.

Figure 2C:
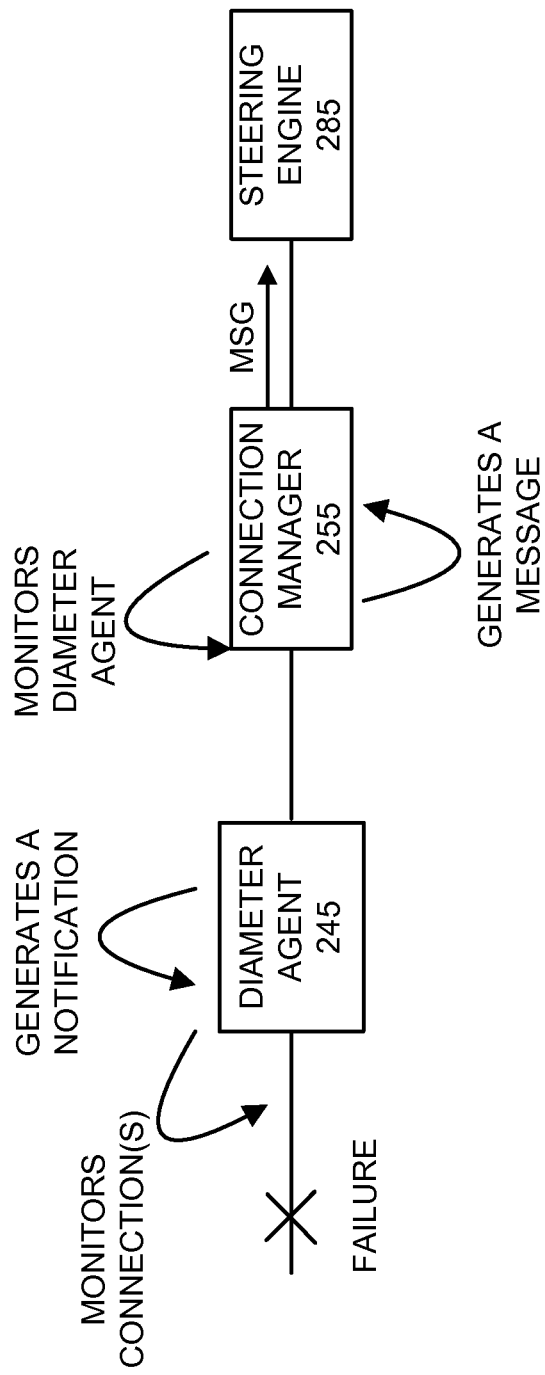
FIGS. 2C-2G are diagrams illustrating exemplary processes pertaining to steering of roaming based on the data stored in the data storage of the steering system.

FIG. 2C is a diagram illustrating an exemplary process pertaining to steering of roaming. According to this process, it may be assumed that Diameter Agent 245 does not include the notification service. An exemplary process pertaining to steering of roaming when Diameter Agent 245 includes the notification service is described further below with respect to FIG. 2G. Referring to FIG. 2C, assume that Diameter Agent 245 monitors connections to visited networks 205 and a failure occurs. In response, Diameter Agent 245 detects a failure event. For example, the Diameter standard includes a watchdog algorithm, which operates at the Diameter application layer, to detect transport failures. The watchdog algorithm transmits Device-Watchdog-Request (DWR) messages until a maximum watchdog back-off interval is reached. Thereafter, the watchdog algorithm may conclude there is a connection failure. Also, the Diameter Agent 245 may use lower layer services (e.g., Transmission Control Protocol (TCP), etc.) to detect a failure. As indicated, upon detection of the failure event, Diameter Agent 245 generates some form of a notification. For example, the notification includes data indicating that a failure has occurred and data indicating other aspects relating to the failure event, such as time, etc. By way of further example, when a failure event occurs during an active session, Diameter Agent 245 may store a state table that indicates a failure event (e.g., failure to send command to the destination).

As further illustrated, connection manager 255 monitors Diameter Agent 245. For example, connection manager 255 may have an inter-process communication with Diameter Agent 245 that allows connection manager 255 to detect when a failure occurs. Connection manager 255 may also detect when a failover procedure is unsuccessful. In response thereto, Connection manager 255 may obtain data stored by Diameter Agent 245 relating to the failure event. Connection manager 255 may also obtain data from other devices or network elements in IPX 240 that pertains to the failure event. For example, IPX 240 may include a roaming intelligence service that monitors and generates alert notices when failure events occur. Connection manager 255 generates a message based on the data that is obtained. Connection manager 255 may transmit the message to steering engine 285 via various protocols (e.g., Simple Object Access Protocol (SOAP)/Extensible Markup Language (XML) over Hypertext Transfer Protocol (HTTP), an HTTP post/get, etc.).

Figure 2D:
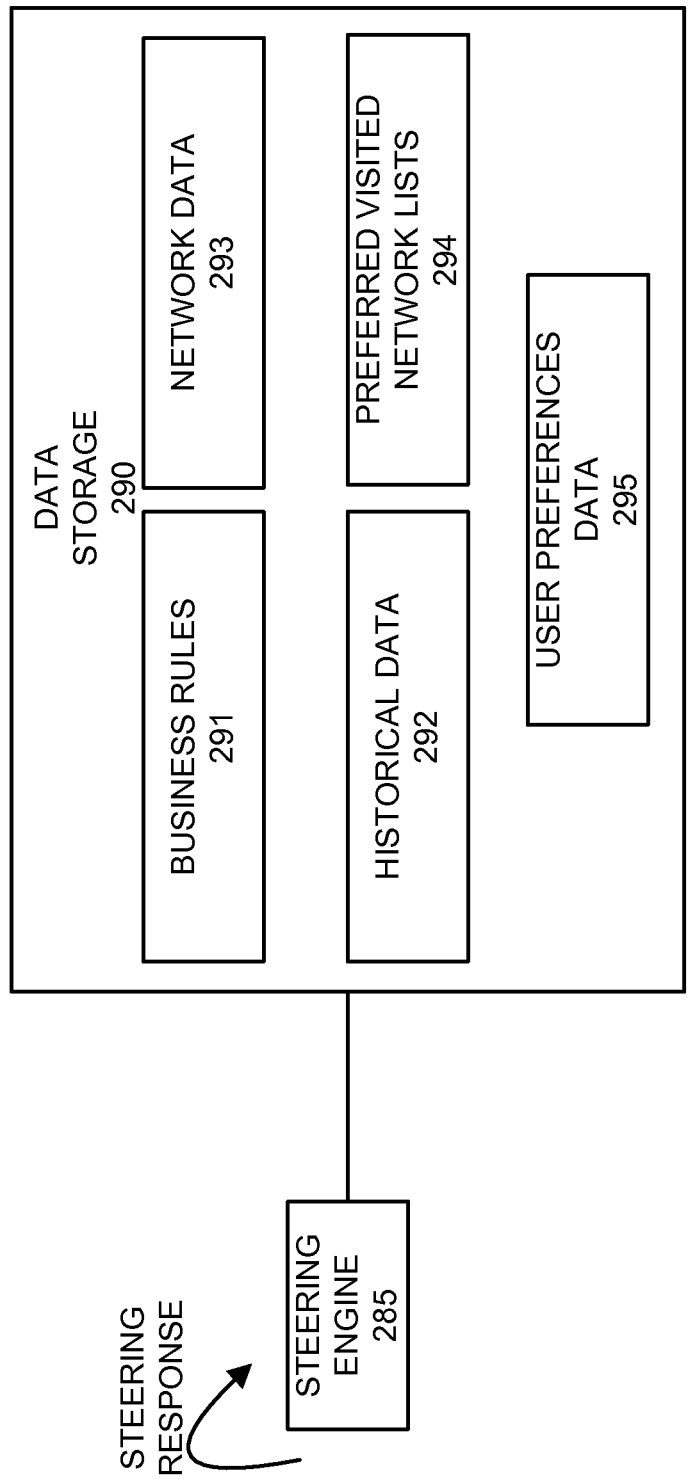

Referring to FIG. 2D, steering engine 285 receives the message from connection manager 255. Steering engine 285 calculates a steering response in response to receiving the message. For example, steering engine 285 may extract data from the message and store data as historical data 292. Steering engine 285 may also update other steering data (e.g., a reliability parameter, etc.). Steering engine 285 may apply, for example, business rules 291, historical data 292, and network data 293 to determine whether a preferred visited network list should be updated or whether no update is necessary.

In the event that steering engine 285 determines to update a preferred visited network list, steering engine 285 may use business rules 291, historical data 292, network data 293, preferred visited network lists 294, and/or user preferences data 295 to generate an updated preferred visited network list. Steering engine 285 may use other data, such as the location of roaming users, when available. For example, a location service in visited network 205 and/or data from home network 260 may be obtained by steering engine 285. In this way, steering engine 285 may use user preferences data 295 when generating the updated preferred visited network list.

Steering engine 285 may select one or multiple preferred visited network lists from preferred visited network lists 295 to modify when generating the updated preferred visited network list. The selection of the preferred visited network list may include a criterion that the visited network 205, with which the failure event is associated, is included in the preferred visited network list. Additionally, or alternatively, the selection of the preferred visited network list may include a criterion that the preferred visited network list pertains to a geographic region, which may not necessarily include the visited network 205 with which the failure event is associated, but is in a proximity thereto (e.g., within X miles, etc.).

Steering engine 285 modifies the selected preferred visited network list in some manner, such as removing a visited network 205 from the list (e.g., visited network 205 associated with the failure event), adding a new visited network 205 to the list, and/or rearranging the order of the preferred visited networks 205.

Steering engine 205 stores the updated preferred visited network list in preferred visited network lists 294. Additionally, the updated preferred visited network list may have a correlation or a link to the previous list (e.g., the selected preferred visited network list), which is described further below in relation to FIG. 3. Steering engine 285 may provide the previous list, as an update, to roaming users subsequent to a recovery of the failure event.

Figure 2E:
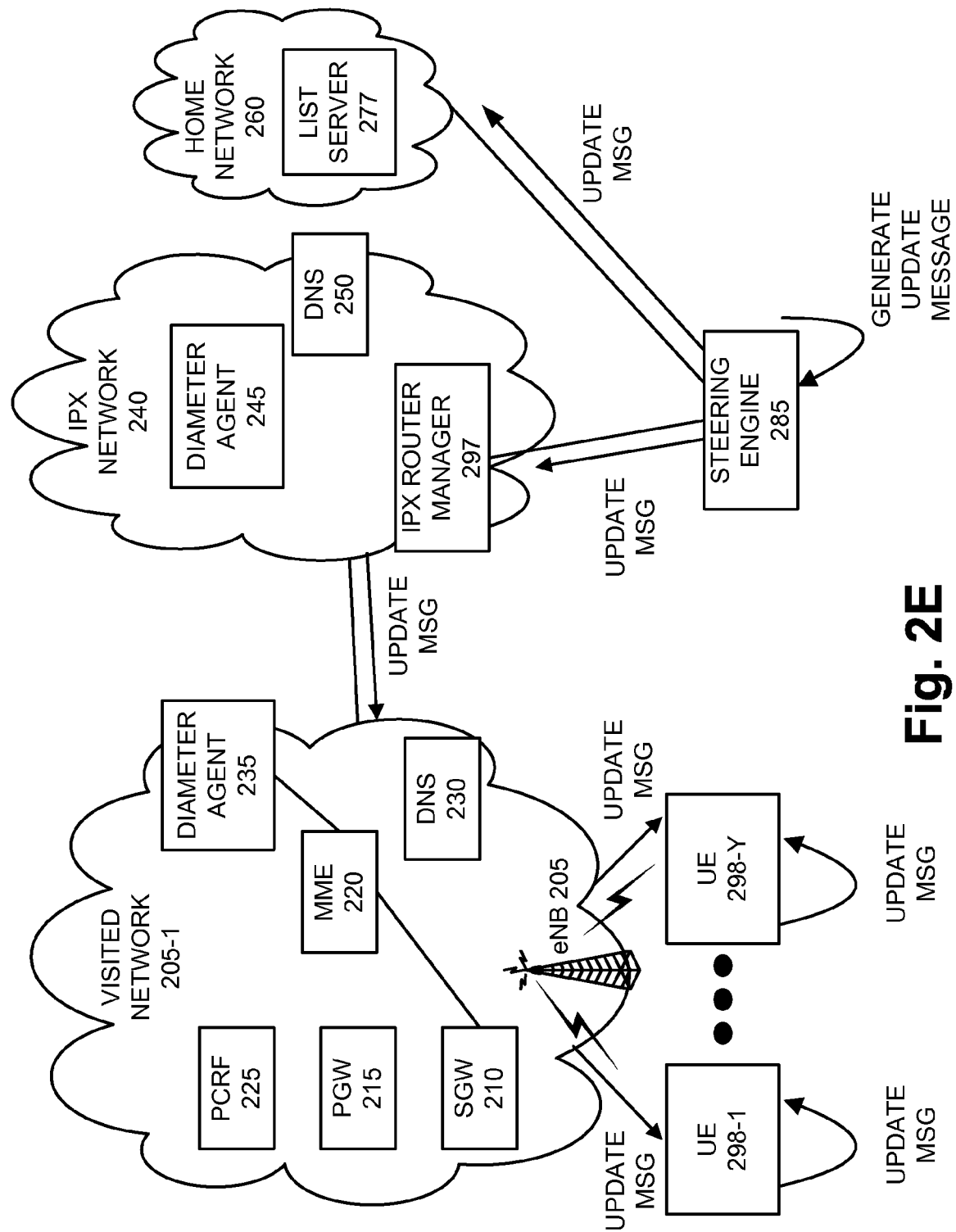

As illustrated in FIG. 2E, steering engine 285 generates an update message. For example, the update message includes the updated preferred visited network list. The update message may be a broadcast, multicast, or unicast message. Steering engine 285 transmits the update message (illustrated as UPDATE MSG) to IPX network 240 (e.g., an IPX Router Manager 297). The update message is received by IPX network 240 and transmitted to UEs 298-1 through 298-Y via visited network 205-1. Additionally, or alternatively, steering engine 285 transmits the update message to list server 277 of home network 150. In response to receiving the update message, list server 277 would provide the updated preferred list to appropriate users. For example, if a link down state is detected for a visited network 205 (e.g., in Germany), the update message, which includes the updated visited network list, may be sent to active roamers attached to other networks in Germany and/or to neighboring countries (e.g., in the Netherlands, Belgium, France, etc.), so that those roaming users in these geographical areas would not attempt to register on visited network 205 whose link outage has been detected. Additionally, the update message may include other parameters, such as, for example, time period for update (e.g., 2 hours, etc.), global update (e.g., all active roaming users, etc.), selective update (e.g., based on geographic area, etc.), and/or designation of a level of service (e.g., target only certain roaming users having at least a certain level of service, etc.). In this way, the update message may be sent to roaming users that are not currently attached to a network, only to active roaming users, etc., depending on parameter settings.

Figure 2F:
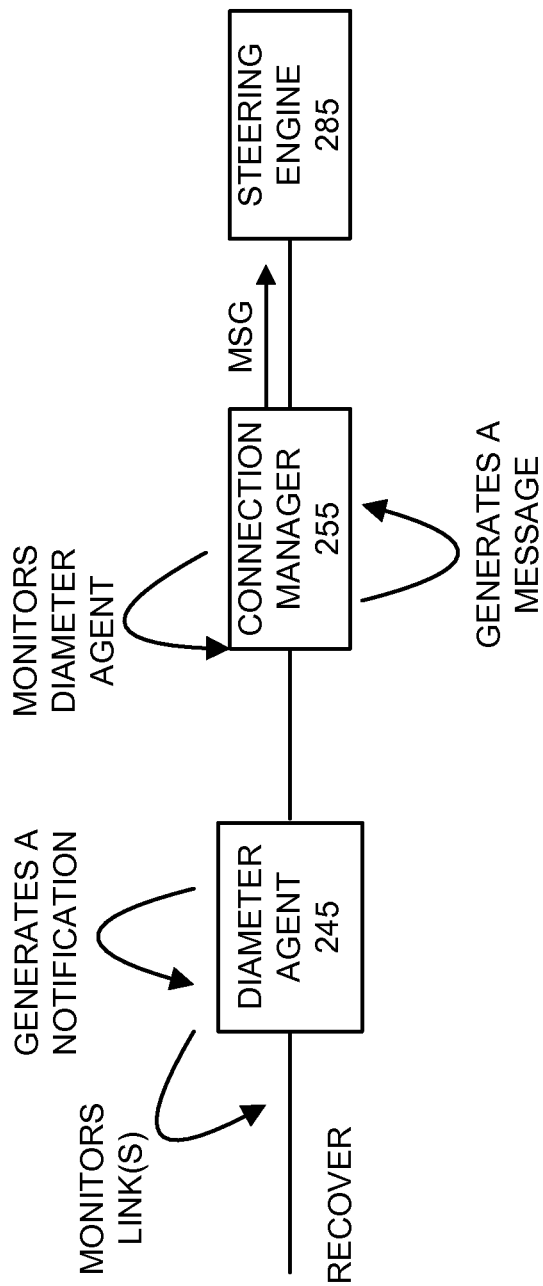

Referring to FIG. 2F, assume that the failure is remedied and Diameter Agent 245 re-establishes a connection status and generates a notification. In a manner similar to that previously described, connection manager 255 monitors Diameter Agent 245 and generates a message, which is transmitted to steering engine 285. Referring back to FIG. 2D, steering engine 285 receives the message from connection manager 255 and calculates a steering response. According to an exemplary embodiment, steering engine 285 stores a log of messages transmitted to and received from connection manager 255. In this way, steering engine 285 may identify a sequence of events (e.g., failures, recoveries, updates lists, etc.) pertaining to the management of steering.

According to an exemplary scenario, assume that the failure lasted one day. That is, the failure and subsequent recovery of the connection did not constitute flapping of the connection. Also assume that steering engine 285 had no other failures, recoveries, updates, etc., to manage during the one day outage. Based on these circumstances, steering engine 285 determines that a preferred visited network list should be provided to roaming users. However, in this case, steering engine 285 may simply select the previous list from preferred visited network lists 294 instead of generating an updated preferred list. For example, steering engine 285 may identify the existence of the link or the correlation of the previous list with the previously transmitted updated preferred list. In this way, steering engine 285 may update UEs 298 of roaming users with a preferred list with minimal latency. Additionally, since the sequence of a failure event, followed by a recovery event, with respect to a particular connection, is likely to be the natural order of events, steering engine 285 may also minimize the use of resources (e.g., processing, etc.) by relying on previously generated preferred visited network lists.

Figure 2G:
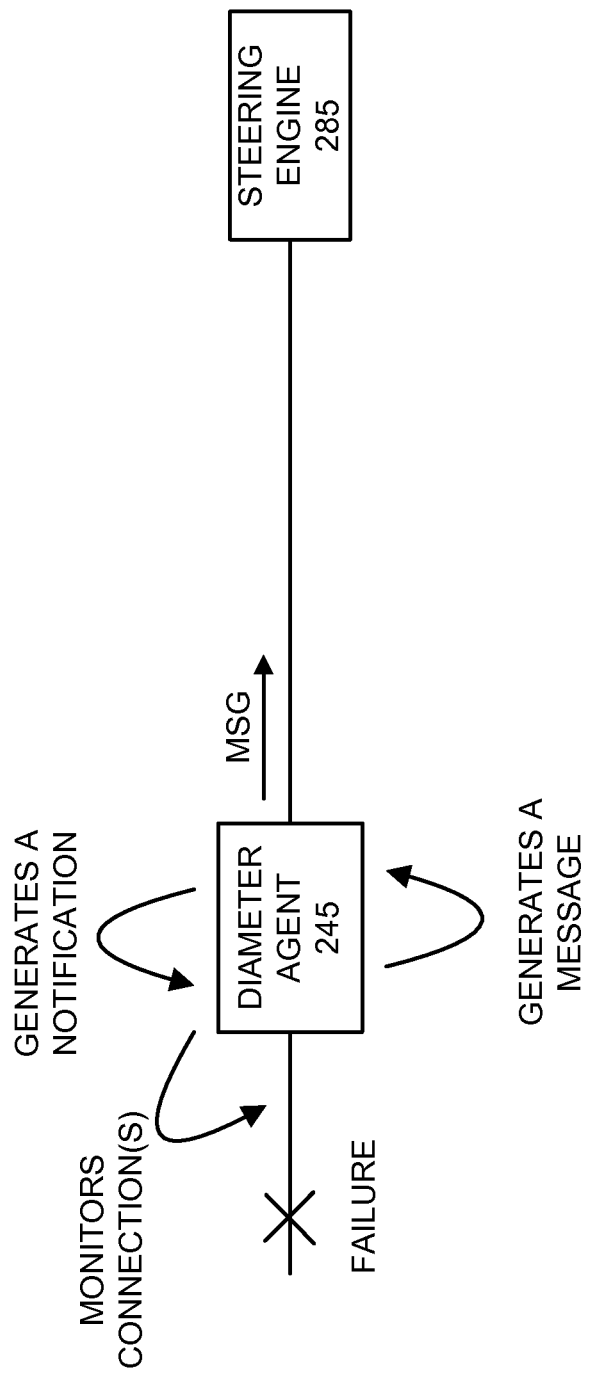

FIG. 2G is a diagram illustrating another exemplary process pertaining to steering of roaming. According to this process, it may be assumed that Diameter Agent 245 includes the notification service. In this regard, connection manager 255 is not depicted. Similar to FIG. 2C, assume that Diameter manager 245 monitors connections to visited networks 205 and a failure occurs. In response, Diameter Agent 245 detects a failure event. For example, as previously described, the Diameter standard includes a watchdog algorithm, which operates at the Diameter application layer, to detect transport failures. Also, the Diameter Agent 245 may use lower layer services (e.g., TCP, etc.) to detect a failure. As indicated, upon detection of the failure event, Diameter Agent 245 generates some form of a notification. For example, as previously described, when a failure event occurs during an active session, Diameter Agent 245 may store a state table that indicates a failure event (e.g., failure to send command to the destination). According to this example, it may be assumed that there is not an alternate Diameter Agent to use (e.g., as a part of a failover procedure). In the event there is an alternate Diameter Agent, the notification service may not be invoked until the failover procedure is unsuccessful. Alternatively, the notification service may be invoked regardless of whether an alternate Diameter Agent and/or the success or failure of the failover procedure.

In response to the detection and/or logging of the failure event, the notification service of Diameter Agent 245 generates a message. For example, the message may be implemented as a CER message, as previously described. For example, the CER message may include an AVP that identifies visited network 105 associated with the link failure (e.g., an MCC, an MNC, etc.) and an AVP (e.g., a vendor-specific AVP) that indicates the state of the link (e.g., down). The notification service may also include an interface to obtain other failure data pertaining to the failure event. For example, a device or a service in IPX network 240 may obtain additional failure data (e.g., reason for link failure, such as a device failure, physical break in link, power outage, estimated time of repair, etc.) that may be provided to the notification service and packaged in the CER using AVPs, etc. Alternatively, steering engine 285 may obtain the additional failure data (e.g., from the device or the service in IPX network 240, etc.). As illustrated in FIG. 2G, Diameter Agent 245 transmits the message (e.g., the CER message) to steering engine 285 or to steering engine 285 via Diameter Agent 280.

As specified in the Diameter standard, the purpose of the capabilities negotiation (e.g., using CER and CEA messaging) is to exchange identities and capabilities between Diameter nodes. However, since the CER message is used to carry the failure data, according to an exemplary embodiment, steering platform 296 may not respond with a CEA message. That is, once steering platform 296 obtains the CER message, there may be no need to maintain a communicative link with Diameter Agent 245. For example, Diameter Agent 280 of steering platform 296 may not generate and transmit a CEA message, which in turn, may cause a disconnection. In this way, the transport layer connection may be purposely disconnected. Alternatively, Diameter Agent 280 or steering engine 285 may generate and transmit a CEA message that causes the transport layer connection to be disconnected (e.g., using certain result code AVPs, such as diameter_no-common_application, no-common_security, etc.). In this way, the transport layer connection may be short-lived. Diameter Agent 280 may include an add-on application to provide this functionality.

In response to obtaining the failure data via the notification service of Diameter Agent 245, steering engine 285 calculates a steering response in a manner previously described in FIG. 2D and elsewhere in this description. A similar process may be executed by the notification service of Diameter Agent 245 when the failure is remedied. According to this example, it may be assumed that a transport layer connection does not exist. Diameter Agent 245 re-establishes a connection and generates a notification. For example, Diameter Agent 245 generates a CER message that identifies the visited network and indicates that the connection is in an up state. Diameter Agent 245 transmits the CER message to steering platform 296 (e.g., Diameter Agent 280, etc.).

Figure 3:
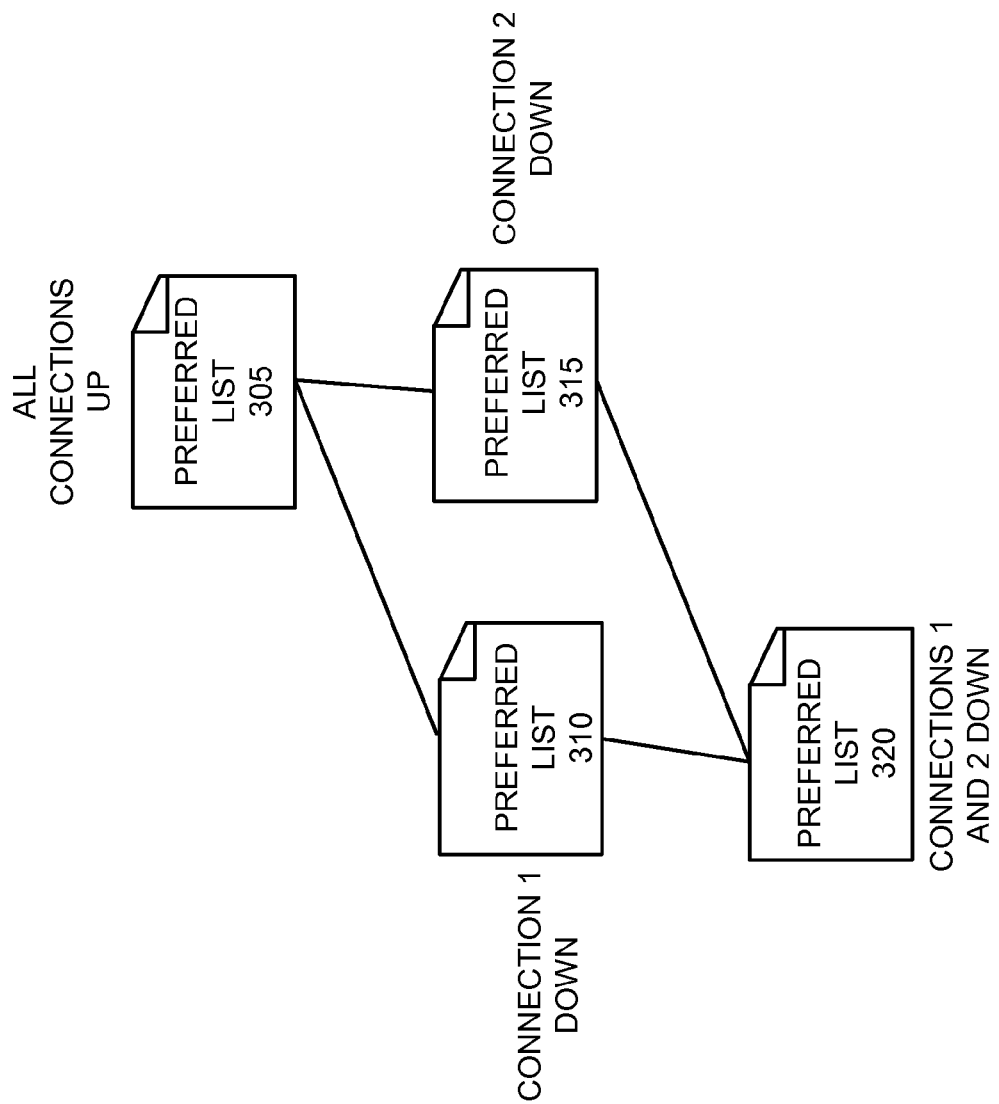
FIG. 3 is a diagram illustrating exemplary data stored in the data storage of the steering system.

FIG. 3 is a diagram illustrating an exemplary data structure pertaining to the links or the correlations between preferred visited network lists. For example, preferred visited network lists 294 of data storage 290 may store a data structure or a state machine that facilitates in the selection and deployment of a preferred visited network list to roaming users. In this example, the data structure corresponds to a tree. According to such an implementation, a preferred list 305 may constitute the parent or the root. Preferred list 305 may be associated with metadata. For example, the metadata may indicate a network state (e.g., all connections up between IPX 245 and visited networks 205). The metadata may also indicate other information, such as a last updated date, the type of failure, IMSIs, etc. As further illustrated in FIG. 3, a preferred list 310, a preferred list 315, and a preferred list 320 are stored with metadata indicating a network state (e.g., connection 1 down, etc.). In a hierarchical manner, preferred list 310, preferred list 315, and preferred list 320 are linked to each other and to preferred list 305. In this way, steering engine 285 may select and transmit a previously generated preferred list with minimal latency.

Referring back to the previous scenario in which the connection recovered, according to other circumstances, steering engine 285 may determine not to provide a preferred visited network list to roaming users or may determine to generate an updated preferred visited network list. By way of example, according to an exemplary scenario, the connection may be flapping (e.g., going up and going down repetitively within short time frames). Under such circumstances, despite the fact that the connection recovered, steering engine 285 may determine not to provide a preferred visited network list to roaming users. The steering response may then constitute merely storing the data included in the update message to historical data 292 or storing the data and updating the steering data (e.g., the reliability parameter, network data 293, etc.). According to another scenario, upon receiving the message indicating that the connection recovered, steering engine 285 may determine to generate an updated preferred visited network list. For example, when storing the data included in the update message to historical data 292, steering engine 285 may determine that the reliability parameter needs to be updated. Steering engine 285 recalculates a value for the reliability parameter. Thereafter, steering engine 285 determines that an updated preferred visited network list should be generated. Additionally, or alternatively, other data stored in data storage 290 may have been updated during the outage (e.g., user preferences data 295, network data 293, and business rules 291) which may provide a basis to generate an updated preferred visited network list.

Figure 4A:
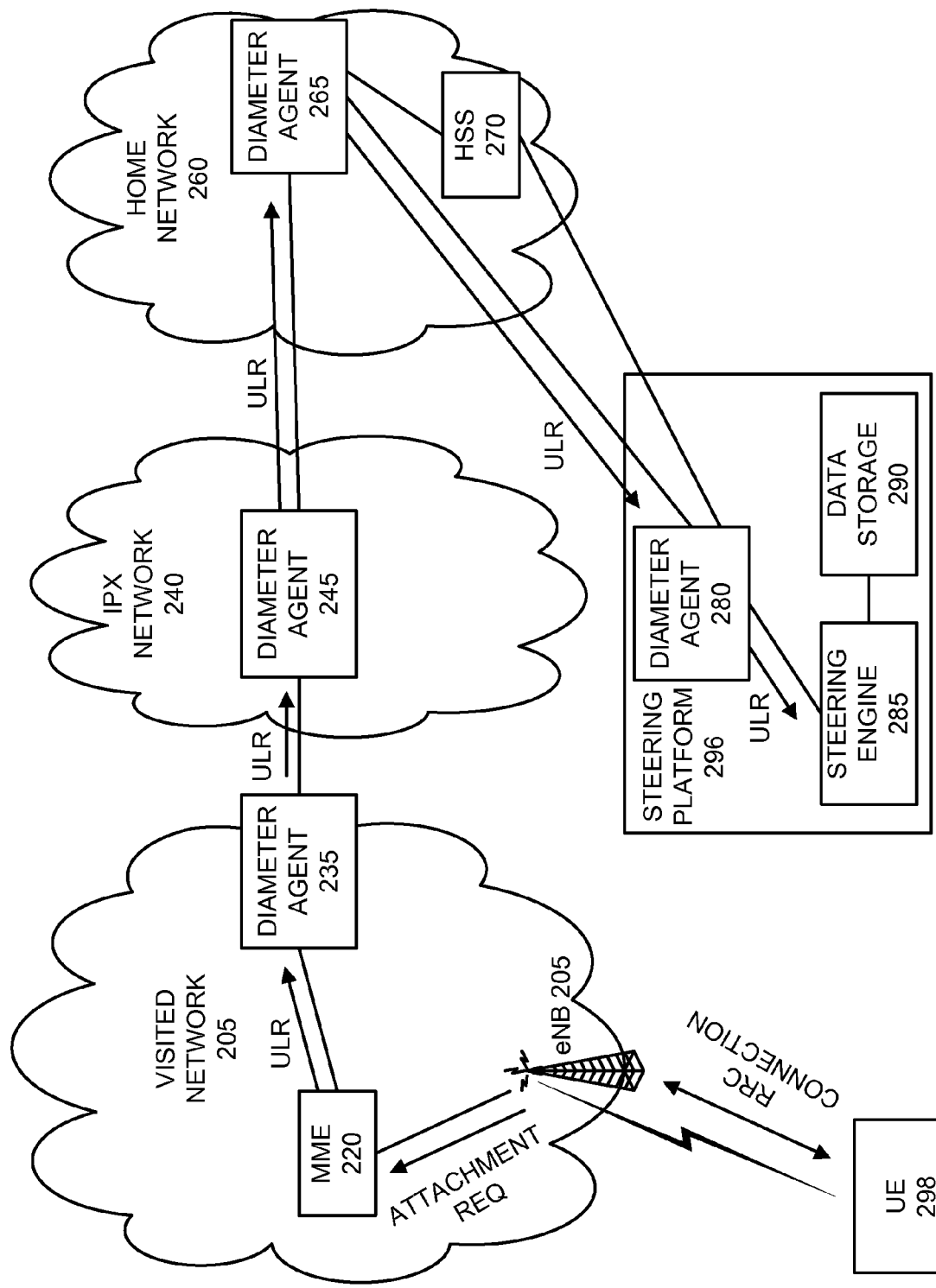
FIGS. 4A-4C are diagrams illustrating an exemplary processes pertaining to steering of roaming according to an exemplary embodiment.
Figure 4B:
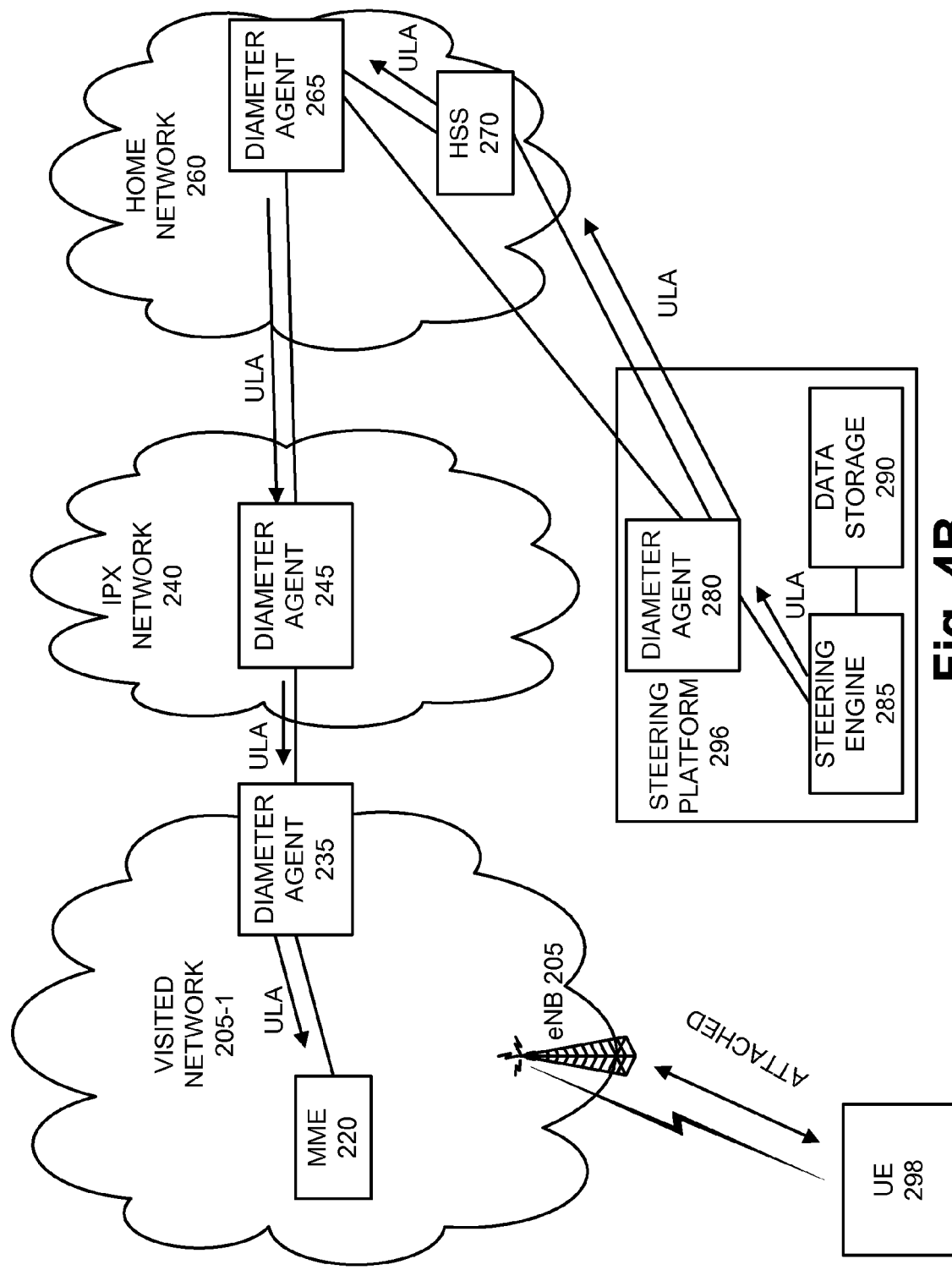
Figure 4C:
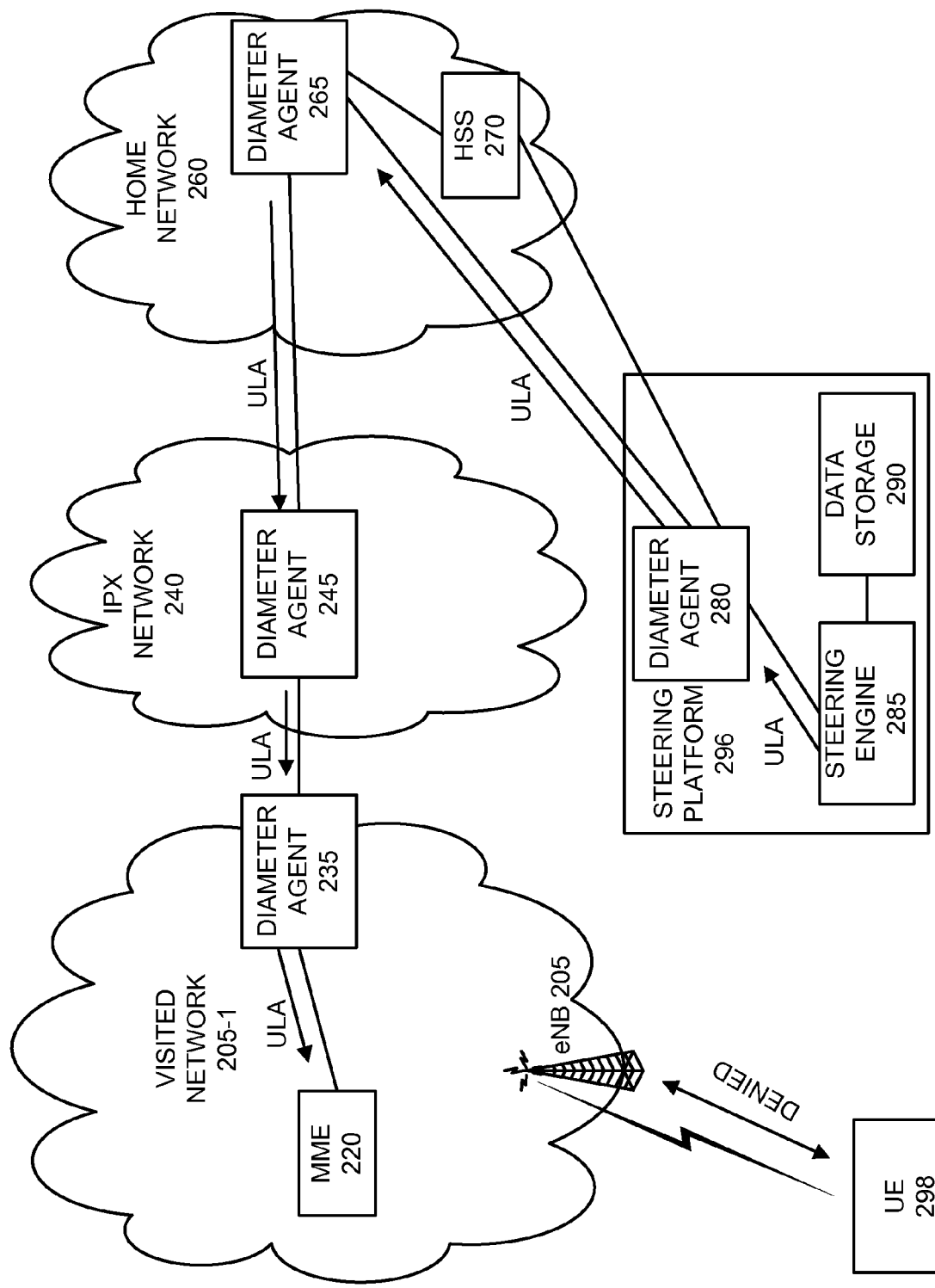

FIGS. 4A-4C are diagrams illustrating exemplary messaging pertaining to steering of roaming. Connection manager 255 is not illustrated for purposes of simplicity. Referring to FIG. 4A, assume that UE 298 and eNB 205 exchanges messages to establish a radio resource control (RRC) connection. ENB 205 may send an attachment request to MME 220. After an RRC connection is established, an authentication procedure may begin. For example, UE 298 may send an authentication request. The authentication request is received by MME. The authentication request may include an IMSI stored by a smart card of UE 298. In response, MME 220 transmits an update-location-request (ULR) message to Diameter Agent 235. In a manner similar to that previously described in relation to FIGS. 1A and 1B, the URL message propagates to Diameter Agent 265 of home network 260 via Diameter Agent 245 of IPX 240. Diameter Agent 265 transmits the ULR to Diameter Agent 280 of steering platform 296. Steering engine 285 includes an interface to receive the ULR message from Diameter Agent 280.

Referring back to FIG. 2D, in response to receiving the ULR message, steering engine 285 calculates a steering response. For example, steering engine 285 may extract data (e.g., the IMSI) from the URL message and determines whether the roaming user of UE 298 should attach to visited network 205-1. Steering engine 285 may use the steering data stored in data storage 290 to make a determination. For example, as previously described in relation to FIG. 3, preferred lists stored in preferred visited network lists 294 may be associated with metadata (e.g., connection state, IMSIs, etc). The user identifiers (IMSIs, user device identifiers, etc.) may be categorized, such as very important person (VIP)-type roaming users and default-type roaming users. The default-type roaming users may be mapped to different preferred visited network lists in a given geographic area (e.g., a country, etc.) than VIP-type roaming users. Depending on the visited network 205 to which the roaming user wishes to attach vis-à-vis the metadata and preferred visited network list, steering engine 285 may determine whether to accept or deny the attachment. For example, if visited network 205 is not included in a particular preferred list or another visited network 205 is ranked higher, then steering engine 285 may deny attachment. Alternatively, if visited network 205 is included in a particular preferred list or is ranked highest in the preferred list, steering engine 285 may accept the attachment.

Steering engine 285 may also use historical data 292 to determine whether to accept or deny attachment. By way of example, although the connection between Diameter Agent 235 and Diameter Agent 245 may be up (since the ULR reached steering engine 285), historical data 292 may indicate that the connection is in a flapping state. Thus, under such circumstances, steering engine 285 may deny the request to attach or wait a back-off period before accepting the request to attach.

FIG. 4B is a diagram illustrating exemplary messaging when steering engine 285 validates the attachment of the roaming user to visited network 205. FIG. 4C is a diagram illustrating exemplary messaging when steering engine 285 does not validate the attachment of the roaming user to visited network 205. Referring to FIG. 4B, in response to determining that the roaming user can attach to visited network 205, steering engine 285 transmits an update-location answer (ULA) to HSS 270 via Diameter Agent 280. HSS 270 receives the ULA message and interprets the ULA, which indicates that the roaming user is authorized to attach to visited network 205. HSS 270 performs authentication, authorization, etc. It may be assumed that the roaming user is successfully authenticated, authorized, etc. HSS 270 transmits a ULA message to Diameter Agent 265. As illustrated in FIG. 4B, the ULA propagates to MME 220 of visited network 205. Thereafter, UE 298 attaches to visited network 205.

Referring to FIG. 4C, steering engine 285 does not validate the attachment of the roaming user to visited network 205. For example, steering engine 285 may not validate the attachment based on user preferences data 295, historical data 292 (e.g., the reliability parameter), and the metadata of preferred visited network lists 294. In this case, steering engine 285 generates a ULA, which indicates that the roaming user is not authorized to attach to visited network 205. In contrast to FIG. 4B, steering engine 285 does not transmit the ULA to HSS 270. Rather, steering engine 285 transmits the ULA to Diameter Agent 265. As illustrated in FIG. 4C, the ULA propagates to MME 220 of visited network 205. Thereafter, UE 298 may attempt to connect to another visited network 205. Steering platform 296 may transmit an updated preferred visited network list to UE 298 when UE 298 attaches to another visited network 205 (not illustrated).

FIG. 5 is a diagram illustrating exemplary components of a device 500 that may correspond to one or more of the devices/network elements previously illustrated and described herein. As illustrated, device 500 includes a processor 505, a memory/storage 510 that stores software 515, a communication interface 520, an input 525, and an output 530. According to other implementations, device 500 may include fewer components, additional components, different components, and/or a different arrangement of components than those illustrated in FIG. 5 and described herein.

Processor 505 includes one or multiple processors, microprocessors, data processors, co-processors, multi-core processors, application specific integrated circuits (ASICs), controllers, programmable logic devices, chipsets, field programmable gate arrays (FPGAs), system on chips (SoCs), programmable logic devices (PLSs), microcontrollers, application specific instruction-set processors (ASIPs), central processing units (CPUs), or some other component that interprets and/or executes instructions and/or data. Processor 505 may be implemented as hardware (e.g., a microprocessor, etc.) or a combination of hardware and software (e.g., a SoC, an ASIC, etc.). Processor 505 may include one or multiple memories (e.g., memory/storage 510), etc.

Processor 505 may control the overall operation, or a portion of operation(s) performed by device 500. Processor 505 may perform one or multiple operations based on an operating system and/or various applications or programs (e.g., software 515). Processor 505 may access instructions from memory/storage 510, from other components of device 500, and/or from a source external to device 500 (e.g., another device, a network, etc.).

Memory/storage 510 includes one or multiple memories and/or one or multiple other types of storage mediums. For example, memory/storage 510 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 510 may include a hard disk (e.g., a magnetic disk, an optical disk, a magneto-optic disk, a solid state disk, etc.) and a corresponding drive. Memory/storage 510 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 510 may include drives for reading from and writing to the storage medium.

Memory/storage 510 may be external to and/or removable from device 500, such as, for example, a Universal Serial Bus (USB) memory stick, a dongle, a hard disk, mass storage, off-line storage, or some other type of storage medium (e.g., a compact disk (CD), a digital versatile disk (DVD), a Blu-Ray® disk (BD), etc.). Memory/storage 510 may store data, software, and/or instructions related to the operation of device 500

Software 515 includes an application or a program that provides a function and/or a process. Software 515 may include firmware. For example, with reference to steering engine 285, software 515 may include an application that, when executed by processor 505, provides the functions of steering engine 285, as described herein.

Communication interface 520 permits device 500 to communicate with other devices, networks, systems and/or the like. Communication interface 520 includes one or multiple wireless interface(s) and/or wired interface(s). For example, communication interface 520 may include one or multiple transmitter(s) and receiver(s), or transceiver(s).

Input 525 provides an input into device 500. For example, input 525 may include a keyboard, a keypad, a touchscreen, a touch pad, a touchless screen, a mouse, an input port, a button, a switch, a microphone, a knob, and/or some other type of input.

Output 530 provides an output from device 500. For example, output 530 may include a display, a speaker, a light (e.g., light emitting diode(s), etc.), an output port, a vibratory mechanism, and/or some other type of output.

Device 500 may perform a function or a process in response to processor 505 executing software instructions stored by memory/storage 510. For example, the software instructions may be read into memory/storage 510 from another memory/storage 510 or read from another device via communication interface 520. The software instructions stored in memory/storage 510 may cause processor 505 to perform processes described herein. Alternatively, according to another implementation, device 500 may perform a process or a function based on the execution of hardware (e.g., processor 505, etc.).

Figure 6A:
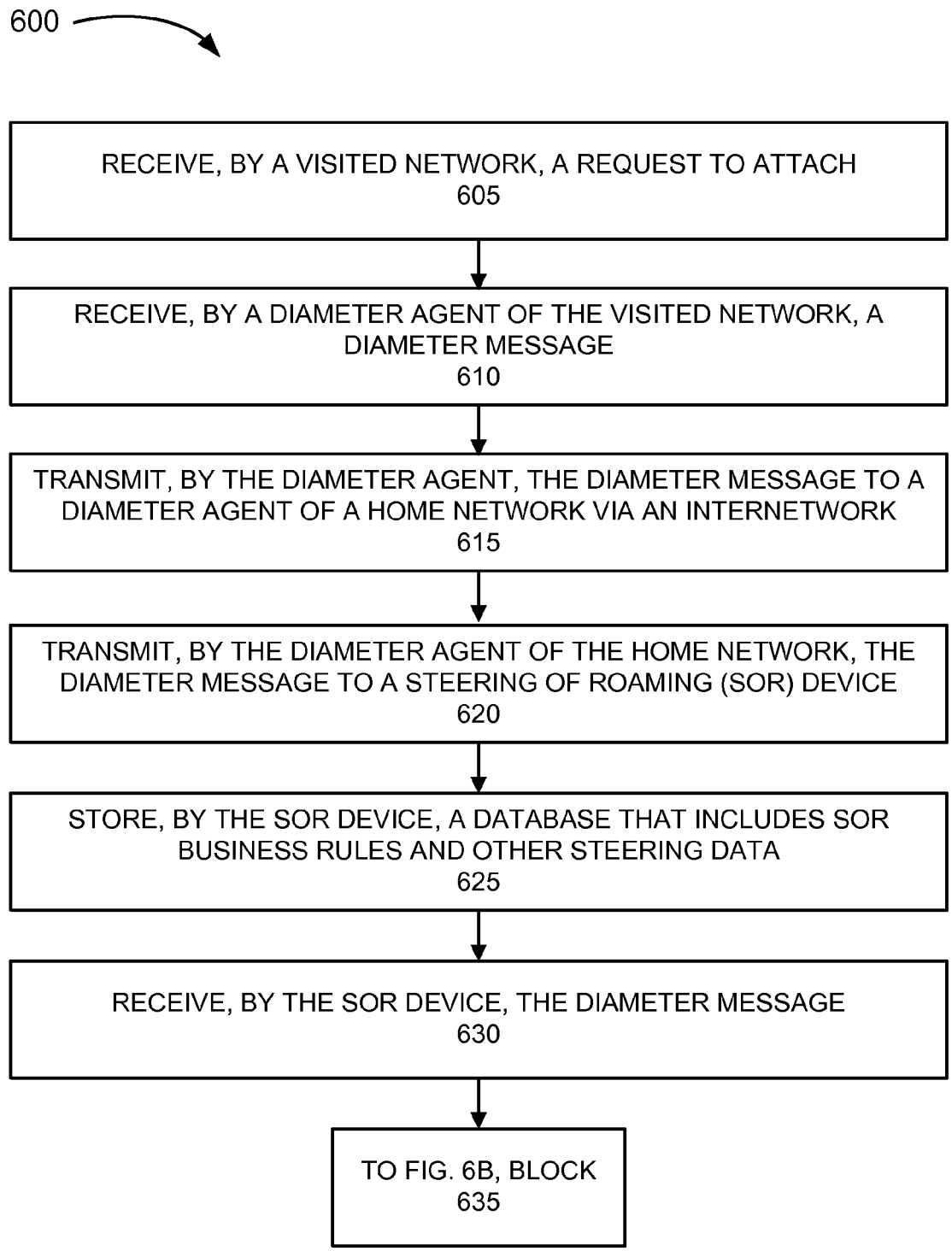
FIGS. 6A and 6B are flow diagrams illustrating an exemplary steering of roaming process invoked by an attachment request to a visited network.
Figure 6B:
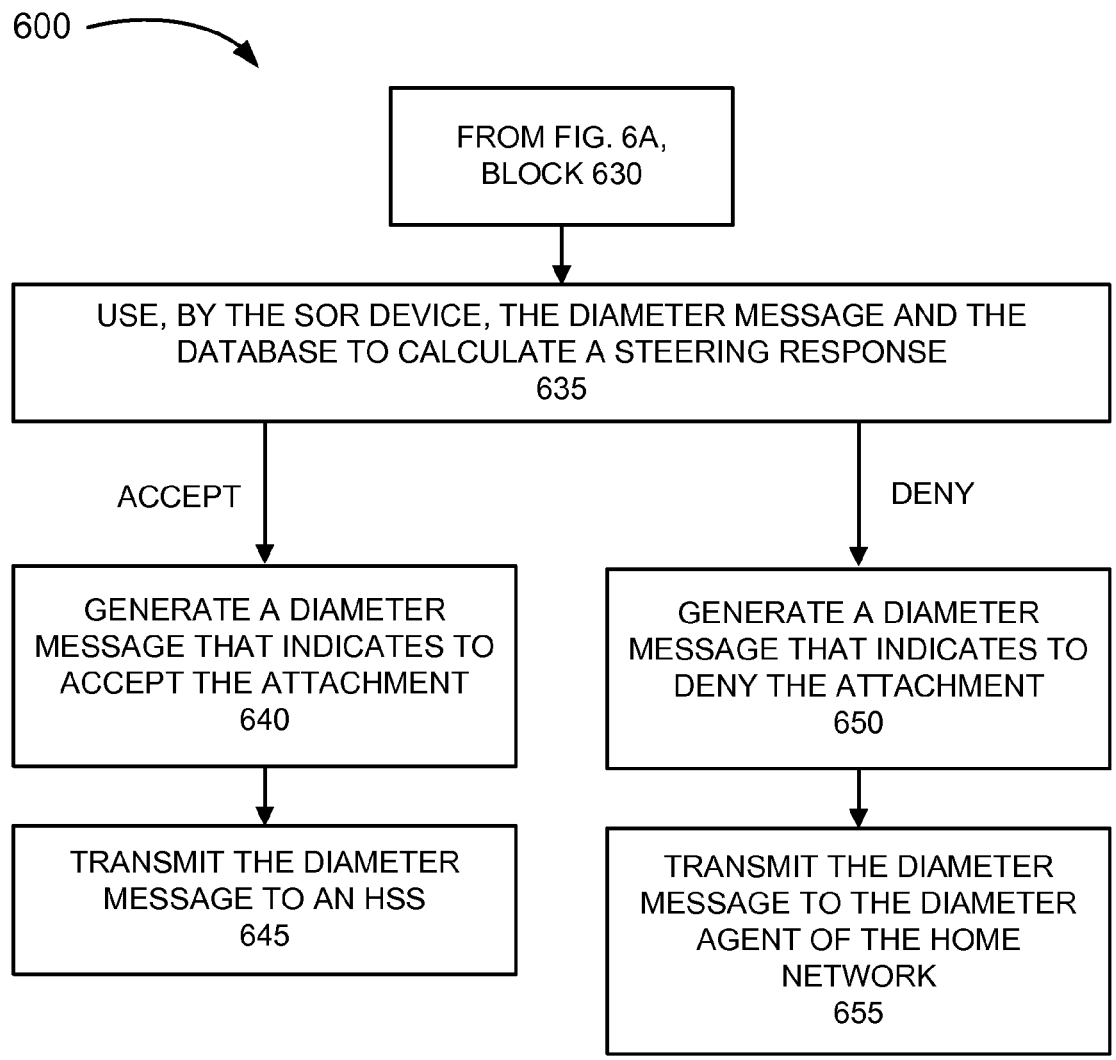

FIGS. 6A and 6B are flow diagrams illustrating an exemplary steering of roaming process 600. Process 600 is directed to a process previously described above with respect to FIGS. 4A-4C and elsewhere, in which steering of roaming engine 285 calculates a steering decision that is responsive to a roaming user's attachment request of visited network 205.

According to an exemplary embodiment, one or more operations of process 600 are performed by steering engine 285. For example, the functionality of steering engine 285 may be implemented as processor 505 executing software 515.

Referring to FIG. 6A, in block 605, process 600 begins with a request to attach being received by a visited network. For example, as previously described, a roaming user of UE 298 initiates an attachment process with visited network 205.

In block 610, a Diameter message is received by a Diameter Agent of the visited network. For example, as previously described, MME 220 of visited network 205 generates and transmits a ULR message to Diameter Agent 235 of visited network 205.

In block 615, the Diameter message is transmitted by the Diameter Agent, via an internetwork, to a Diameter Agent of a home network. For example, as previously described, Diameter Agent 235 transmits the ULR message to Diameter Agent 265 via Diameter Agent 245 of IPX network 240.

In block 620, the Diameter message is transmitted by the Diameter Agent of the home network to a steering of roaming (SOR) device. For example, as previously described, Diameter Agent 265 transmits the ULR message to a Diameter Agent 280 of steering platform 296. Diameter Agent 280 transmits the ULR message to a steering engine 285.

In block 625, the SOR device stores a database that includes SOR business rules and other steering data. For example, as previously described, steering platform 296 includes data storage 290. According to an exemplary embodiment, as previously described, data storage 290 stores business rules 291 and other steering data (e.g., historical data 292, network data 293, preferred visited network lists 294, and/or user preferences data 295).

In block 630, the Diameter message is received by the SOR device. For example, as previously described, steering engine 285 receives the ULR from Diameter Agent 280.

Referring to FIG. 6B, in block 635, the SOR device uses the Diameter message and the database to calculate a steering response. For example, as previously described, steering engine 285 uses data included in the Diameter message (e.g., an IMSI of the roaming user) and the steering data stored in data storage 290 to calculate a steering response. By way of example, steering engine 285 may use the IMSI included in the Diameter message in combination with preferred visited network listed in preferred visited network lists 294 to determine whether to accept or deny the attachment to visited network 205. For example, as previously described, preferred lists may be associated with metadata that includes IMSIs (e.g., VIP-type roaming users, etc.). Additionally, or alternatively, steering engine 285 may make a determination whether to accept or deny attachment based on the other types of steering data (e.g., reliability parameter, user preferences, network data (e.g., geographic size, etc.), etc.

As illustrated in FIG. 6B, process 600 includes two separate flows based on the steering response to accept attachment or deny attachment. The accept flow and the deny flow are described below. Referring to the accept flow, in block 640, the SOR device generates a Diameter message that indicates to accept the attachment. For example, as previously described, steering engine 285 generates an update-location answer (ULA) message, which indicates that the roaming user may attach to visited network 205.

In block 645, the SOR device transmits the Diameter message to an HSS. For example, as previously described, steering engine 285 transmits the ULA message to HSS 270. Thereafter, HSS 270 performs authentication, authorization, etc., as previously described. HSS 270 transmits a ULA message to Diameter Agent 265. Diameter Agent 265 transmits the ULA message to MME 220 of visited network 205. UE 298 attaches to visited network 205.

Referring to the deny flow, in block 650, the SOR device generates a Diameter message that indicates to deny the attachment. For example, as previously described, steering engine 285 generates an update location answer (ULA) message, which indicates that the roaming user is not authorized to attach to visited network 205.

In block 655, the SOR device transmits the Diameter message to the Diameter Agent of the home network. As previously described, in contrast to the accept flow, steering engine 285 does not transmit the ULA message to HSS 270. Rather, steering engine 285 transmits the ULA message to Diameter Agent 265. Diameter Agent 265 transmits the ULA message to MME 220 of visited network 205. UE 298 is unable to attach to visited network 205.

Although FIGS. 6A and 6B illustrate an exemplary process 600, according to other implementations, process 600 may include additional operations, fewer operations, and/or different operations than those illustrated in FIGS. 6A and 6B, and described herein.

Figure 7:
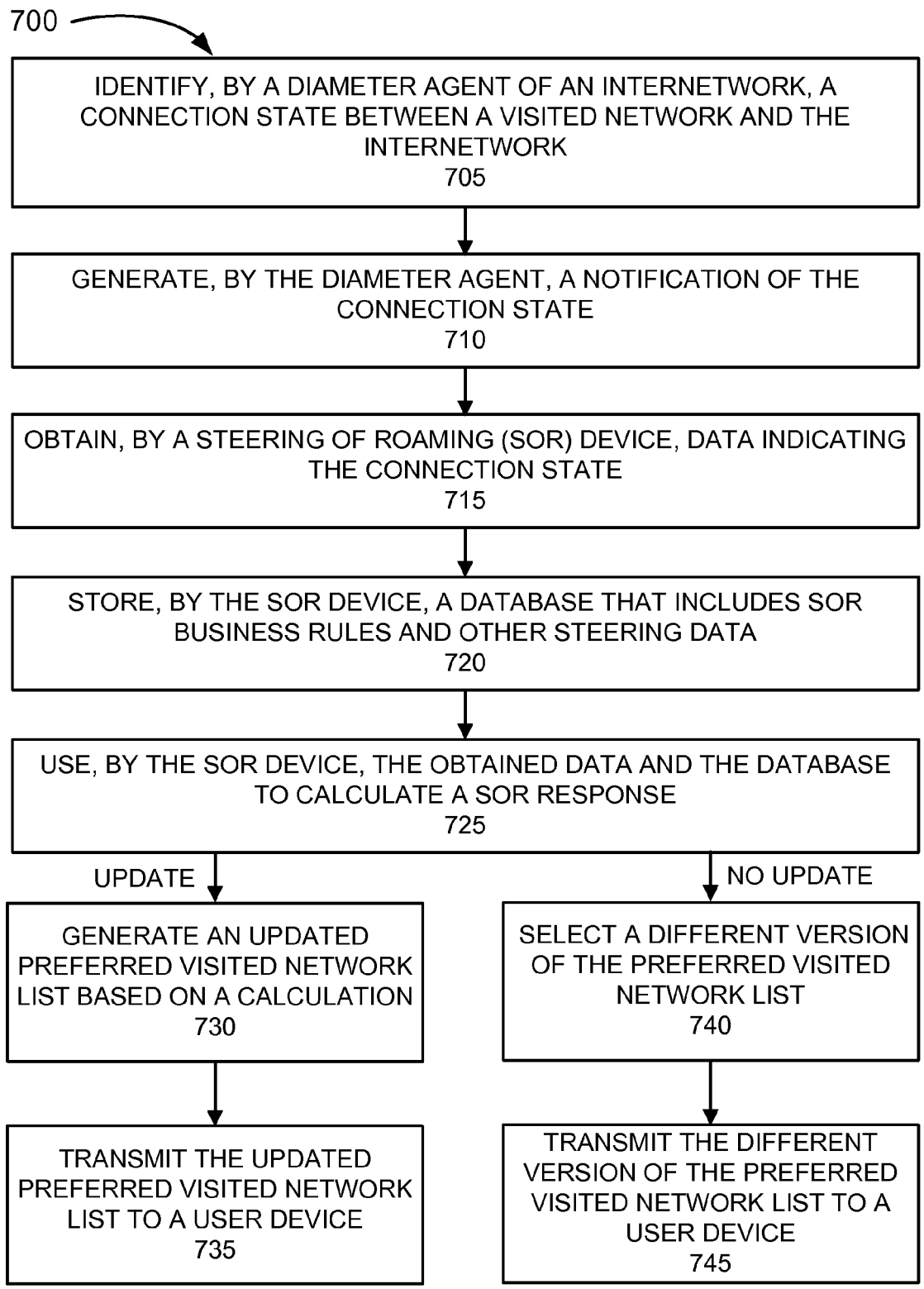
FIG. 7 is a flow diagram illustrating another exemplary steering of roaming process invoked by a change of connection state.

FIG. 7 is a flow diagram illustrating an exemplary steering of roaming process 700. Process 700 is directed to a process previously described above with respect to FIGS. 2C-2F, 3, and elsewhere, in which steering of roaming engine 285 calculates a steering decision that is responsive to a change in connection state. According to an exemplary embodiment, one or more operations of process 700 are performed by steering engine 285. For example, the functionality of steering engine 285 may be implemented as processor 505 executing software 515.

Referring to FIG. 7, in block 705, process 700 begins with identifying, by a Diameter Agent of an internetwork, a connection state between a visited network and the internetwork. For example, as previously described, Diameter Agent 245 of IPX network 240 monitors connections to visited networks 205. For example, Diameter Agent 245 may use a watchdog algorithm, lower layer services, and other functionality provided by the Diameter standard.

In block 710, the Diameter Agent generates a notification indicating the connection state. For example, as previously described, Diameter Agent 245 may store a state table that indicates a failure event with respect to a failed connection.

In block 715, data indicating the connection state is obtained by a steering of roaming (SOR) device. For example, as previously described, connection manager 255 monitors Diameter Agent 245. According to an exemplary implementation, connection manager 255 may have an inter-process communication with Diameter Agent 245. Connection manager 255 obtains data pertaining to the failed connection from Diameter Agent 245. Connection manager 255 may obtain additional data from other network elements/services provided by IPX 240. Connection manager 255 generates a connection state message based on the obtained data. Connection manager 255 transmits the connection state message to steering engine 285.

Alternatively, the notification service of Diameter Agent 245 generates and transmits a message to steering engine 285. For example, the message may be implemented as a CER message. The message may include an AVP that identifies visited network 105 associated with the failure event and an AVP that indicates the connection state (e.g., down). The message may also include additional failure data.

In block 720, the SOR device stores a database that includes SOR business rules and other steering data. For example, as previously described, steering platform 296 includes data storage 290. According to an exemplary embodiment, as previously described, data storage 290 stores business rules 291 and other steering data (e.g., historical data 292, network data 293, preferred visited network lists 294, and/or user preferences data 295).

In block 725, the SOR device uses the obtained data and the database to calculate an SOR response. For example, as previously described, steering engine 285 uses the data included in the connection state message and the steering data stored in data storage 290 to calculate a steering response.

As illustrated in FIG. 7, process 700 includes two separate flows based on the steering response to generate an updated preferred list or not to generate an updated preferred list (e.g., to select another version of a preferred list). The update flow and the no update flow are described below. Referring to the update flow, in block 730, the SOR device generates an updated preferred visited network list based on a calculation or a determination. For example, as previously described, steering engine 285 may use the steering data stored in data storage 290 to generate the updated preferred visited network list. By way of further example, steering engine 285 may use preferred visited network lists 294 and, business 291, historical data 292, network data 293, and/or user preferences data 295. Steering engine 285 may select one or multiple preferred visited network lists from preferred visited network lists 295 to modify when generating the updated preferred visited network list. Steering engine 285 may update the selected preferred visited network list in some manner, such as removing a visited network 205 from the list (e.g., visited network 205 associated with the failure event), adding a new visited network 205 to the list, and/or rearranging the order of the preferred visited networks 205.

In block 735, the SOR device transmits the updated preferred visited network list to a user device. For example, as previously described, steering engine 285 generates an update message, which includes the updated preferred visited network list. The update message may be a broadcast, multicast, or unicast message. Steering engine 285 transmits the update message and UE 298 receives the update message.

Referring to the no update flow, in block 740, the SOR device selects a different version of the preferred visited network list based on a calculation or a determination. For example, as previously described, steering engine 285 may use the steering data stored in data storage 290 to select a different version (e.g., relative to a last transmitted, currently deployed, etc.) of the preferred visited network list. By way of further example, steering engine 285 may use the metadata associated with preferred lists and the links between preferred lists to select a different version of the preferred visited network list.

In block 745, the SOR device transmits the different version of the preferred visited network list to a user device. For example, as previously described, steering engine 285 generates an update message, which includes the updated preferred visited network list. The update message may be a broadcast, multicast, or unicast message. Steering engine 285 transmits the update message and UE 298 receives the update message.

Although FIG. 7 illustrates an exemplary process 700, according to other implementations, process 700 may include additional operations, fewer operations, and/or different operations than those illustrated in FIG. 7, and described herein. For example, process 700 may include, in the update flow and/or the no update flow, operations to update the steering data stored in data storage 290, as previously described. For example, steering engine 285 may use the metadata (e.g., the last updated data) associated with the preferred lists stored in preferred visited network lists 294 as a basis to update the steering data. For example, assume that the last updated date indicates a time period of over six months and during that time a number of failures occurred. The last updated data may serve as another basis to update the reliability parameter stored in historical data 292.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks are described with regard to the processes illustrated in FIGS. 6A, 6B, and 7, the order of the blocks may be modified in other implementations. Further, non-dependent blocks may be performed in parallel. Additionally, with respect to other processes described in this description, the order of operations may be different according to other implementations, and non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 505, etc.), or a combination of hardware and software (e.g., software 515). The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 510.

Various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

No element, act, operation, or instruction described in the present application should be construed as critical or essential to the embodiments described herein unless explicitly described as such.

What is claimed is:

1. A method comprising:
   storing, by a network device, steering data pertaining to steering of roaming users;
   receiving, by the network device, a request for subscriber data pertaining to a roaming user seeking to attach to a visited network, wherein the request includes a user identifier that identifies the roaming user;

calculating, by the network device, a steering of roaming decision in response to receiving the request, wherein the calculating comprises:
  using the steering data and the user identifier to determine whether to accept or deny the visited network as a network to which the roaming user can attach;
transmitting, by the network device, a response that indicates to accept the visited network in response to a calculation indicating to accept the visited network as the network to which the roaming user can attach; and
transmitting, by the network device, a response that indicates to deny the visited network in response to a calculation indicating to deny the visited network as the network to which the roaming user can attach, and wherein the steering data includes historical data that indicates connection states between a Diameter agent of an internetwork and Diameter agents of visited networks, wherein the visited networks include the visited network, and wherein the calculating further comprises calculating the steering of roaming decision based on the historical data.

2. The method of claim 1, wherein:
the request for subscriber data includes an update location-request message of a Diameter protocol;
the response that indicates to accept the visited network is transmitted to a home subscriber server of a home network of the roaming user as an update location-answer message of the Diameter protocol; and
the response that indicates to deny the visited network is transmitted to a Diameter agent of the home network of the roaming user as the update location-answer message of the Diameter protocol.

3. The method of claim 1, wherein the steering data includes business rules and preferred visited network list data, and wherein the calculating comprises calculating the steering of roaming decision based on at least one of the business rules or the preferred visited network list data.

4. The method of claim 1, further comprising:
monitoring the connection states between the Diameter agent of the internetwork and the Diameter agents of the visited networks.

5. The method of claim 1, further comprising:
receiving connection state data from the Diameter agent of the internetwork; and
storing the connection state data as the historical data, wherein the internetwork includes an Internetwork Packet Exchange (IPX)/Sequenced Packet Exchange (SPX) network.

6. The method of claim 5, wherein the connection state data indicates a change in a connection state relative to a connection between the Diameter agent of the IPX/SPX network and at least one of the Diameter agents of at least one of the visited networks, and the method further comprising:
calculating another steering of roaming decision in response to receiving the connection state data, wherein the change in connection state is one of the connection going from an up state to a down state due to a failure or the connection going from the down state to the up state due to a recovery.

7. The method of claim 6, wherein the calculating the other steering of roaming decision comprises:
determining whether to update a preferred visited network list.

8. A device comprising:
a communication interface;
a memory, wherein the memory stores instructions; and
a processor, wherein the processor executes the instructions to:
  store steering data pertaining to steering of roaming users;
  receive, via the communication interface, a request for subscriber data pertaining to a roaming user seeking to attach to a visited network, wherein the request includes a user identifier that identifies the roaming user;
  calculate a steering of roaming decision in response to receiving the request, wherein a calculation comprises:
    use the steering data and the user identifier to determine whether to accept or deny the visited network as a network to which the roaming user can attach;
  transmit, via the communication interface, a response that indicates to accept the visited network in response to the calculation indicating to accept the visited network as the network to which the roaming user can attach; and
  transmit, via the communication interface, a response that indicates to deny the visited network in response to the calculation indicating to deny the visited network as the network to which the roaming user can attach, and wherein the steering data includes historical data that indicates connection states between a Diameter agent of an internetwork and Diameter agents of visited networks, wherein the visited networks include the visited network, and wherein, when calculating the steering of roaming decision, the processor executes the instructions to:
    calculate the steering of roaming decision based on the historical data.

9. The device of claim 8, wherein the processor executes the instructions to:
monitor the connection states between the Diameter agent of the internetwork and the Diameter agents of the visited networks.

10. The device of claim 8, wherein the processor executes the instructions to:
receive, via the communication interface, connection state data from the Diameter agent of the internetwork, wherein the connection state data indicates a change in a connection state relative to a connection between the Diameter agent of the internetwork and at least one of the Diameter agents of at least one of the visited networks;
store the connection state data as the historical data; and
calculate another steering of roaming decision in response to a receipt of the connection state data, wherein the change in connection state is one of the connection going from an up state to a down state due to a failure or the connection going from the down state to the up state due to a recovery.

11. The device of claim 10, wherein, when calculating the other steering of roaming decision, the processor executes the instructions to:
determine whether to select a different version of a preferred visited network list relative to a last transmitted version of the preferred visited network list; and
transmit to at least one user device, via the communication interface, the different version of the preferred visited network list in response to a determination to select the different version of the preferred visited network list.

12. The device of claim 10, wherein the steering data includes business rules, preferred visited network list data, and user preference data, and wherein, when calculating the other steering decision, the processor executes the instructions to:
  determine whether to update the steering data.

13. A non-transitory storage medium storing instructions executable by a computational device, wherein the instructions comprise instructions to:
  manage steering data pertaining to steering of roaming users;
  receive a request for subscriber data pertaining to a roaming user seeking to attach to a visited network, wherein the request includes a user identifier that identifies the roaming user;
  calculate a steering of roaming decision in response to receiving the request, wherein instructions to calculate the steering of roaming decision comprises instructions to:
    use the steering data and the user identifier to determine whether to accept or deny the visited network as a network to which the roaming user can attach;
  transmit a response that indicates to accept the visited network in response to the calculation indicating to accept the visited network as the network to which the roaming user can attach; and
  transmit a response that indicates to deny the visited network in response to the calculation indicating to deny the visited network as the network to which the roaming user can attach, and wherein the steering data includes historical data that indicates connection states between a Diameter agent of an internetwork and Diameter agents of visited networks, wherein the visited networks include the visited network, and wherein instructions to calculate the steering of roaming decision comprise instructions to:
  calculate the steering of roaming decision based on the historical data.

14. The non-transitory storage medium of claim 13, further comprising instructions to:
  monitor the connection states between the Diameter agent of the internetwork and the Diameter agents of the visited networks.

15. The non-transitory storage medium of claim 13, further comprising instructions to:
  receive connection state data from the Diameter agent of the internetwork, wherein the connection state data indicates a change in a connection state relative to a connection between the Diameter agent of the internetwork and at least one of the Diameter agents of at least one of the visited networks;
  store the connection state data as historical data; and
  calculate another steering of roaming decision in response to a receipt of the connection state data, wherein the change in connection state is one of the connection going from an up state to a down state due to a failure or the connection going from the down state to the up state due to a recovery.

16. The non-transitory storage medium of claim 13, wherein the steering data includes business rules and preferred visited network list data, wherein the preferred visited network list data includes a preferred visited network list mapped to one or more user identifiers, and wherein instructions to calculate the steering of roaming decision comprise instructions to:
  calculate the steering of roaming decision based on the steering data.

17. A method comprising:
  receiving, by a network device, data indicating a change in a connection state relative to a connection between a Diameter agent of an internetwork and at least one Diameter agent of a visited network, wherein the change in connection state is one of the connection going from an up state to a down state due to a failure or the connection going from the down state to the up state due to a recovery;
  calculating, by the network device, a steering of roaming decision in response to the receiving, wherein the calculating comprises:
    using steering data to calculate the steering of roaming decision, wherein the steering data includes historical data that indicates connection states between the Diameter agent of the internetwork and Diameter agents of visited networks, wherein the visited networks include the visited network; and
    determining whether to update a preferred visited network list; and
  transmitting to one or more user devices associated with one or more roaming users, by the network device, the preferred visited network list, in response to determining to update the preferred visited network list.

18. The method of claim 17, further comprising:
  determining whether to select a different version of a preferred visited network list relative to a last transmitted version of the preferred visited network list; and
  transmitting, to the one or more user devices, the different version of the preferred visited network list, in response to determining to select the different version of the preferred visited network list.

19. The method of claim 17, further comprising:
  storing steering data pertaining to steering of roaming users;
  receiving a request for subscriber data pertaining to a roaming user seeking to attach to a visited network, wherein the request includes a user identifier that identifies the roaming user;
  calculating another steering of roaming decision in response to receiving the request, wherein the calculating comprises:
    using the steering data and the user identifier to determine whether to accept or deny the visited network as a network to which the roaming user can attach;
  transmitting a response that indicates to accept the visited network in response to a calculation indicating to accept the visited network as the network to which the roaming user can attach; and
  transmitting a response that indicates to deny the visited network in response to a calculation indicating to deny the visited network as the network to which the roaming user can attach.

20. The method of claim 19, wherein the steering data includes business rules and preferred visited network list data, and wherein the calculating comprises calculating the other steering of roaming decision based on at least one of the business rules or the preferred visited network list data.

21. The method of claim 19, wherein:
  the request for subscriber data includes an update location-request message of a Diameter protocol;
  the response that indicates to accept the visited network is transmitted to a home subscriber server of a home network of the roaming user as an update location-answer message of the Diameter protocol; and the response that indicates to deny the visited network is transmitted to a Diameter agent of the home network of the roaming user as the update location-answer message of the Diameter protocol.

22. The method of claim 17, wherein the receiving comprises:
receiving the data from the Diameter agent of the internetwork.

23. The method of claim 22, further comprising:
identifying, by the Diameter agent, the change in the connection state;
generating, by the Diameter agent, a Diameter message that indicates the connection state of the connection; and
transmitting the Diameter message to the network device.

24. The method of claim 23, wherein the Diameter message includes a Capabilities-Exchange-Request message that includes an attribute value pair that identifies the visited network and an attribute value pair that indicates the connection state of the connection.

25. The method of claim 23, further comprising:
purposely causing a transport layer connection between the Diameter Agent and the network device to terminate in response to receiving the Diameter message.

* * * * *